US008598988B2

(12) United States Patent
Overhultz et al.

(10) Patent No.: US 8,598,988 B2
(45) Date of Patent: Dec. 3, 2013

(54) SYSTEMS AND METHODS FOR CONTROLLING SERIALLY CONNECTED TRANSMITTERS IN RFID TAG TRACKING

(75) Inventors: Gary L. Overhultz, River Forest, IL (US); John W. Pyne, Erie, CO (US); Gordon E. Hardman, Boulder, CO (US)

(73) Assignee: OSA Acquisition, LLC, Chicago, IL (US)

( * ) Notice: Subject to any disclaimer, the term of this patent is extended or adjusted under 35 U.S.C. 154(b) by 757 days.

(21) Appl. No.: 12/732,797

(22) Filed: Mar. 26, 2010

(65) Prior Publication Data

US 2010/0245053 A1    Sep. 30, 2010

Related U.S. Application Data

(60) Provisional application No. 61/164,095, filed on Mar. 27, 2009.

(51) Int. Cl.
*H04Q 5/22* (2006.01)
*G08B 13/14* (2006.01)

(52) U.S. Cl.
USPC ..... 340/10.1; 340/10.4; 340/10.5; 340/572.7; 235/472.02

(58) Field of Classification Search
USPC ............ 340/10.1–10.5, 572.7, 539.22, 531, 340/539; 235/472.02; 342/51; 357/11; 343/906

See application file for complete search history.

(56) References Cited

U.S. PATENT DOCUMENTS

| 3,733,602 | A | * | 5/1973 | Cuckler et al. | 342/27 |
|---|---|---|---|---|---|
| 6,006,112 | A | * | 12/1999 | Rucki et al. | 455/561 |
| 7,084,769 | B2 | * | 8/2006 | Bauer et al. | 340/572.7 |
| 7,317,379 | B2 | * | 1/2008 | Kimura | 340/10.51 |
| 7,586,416 | B2 | * | 9/2009 | Ariyoshi et al. | 340/572.7 |
| 2006/0238307 | A1 | * | 10/2006 | Bauer et al. | 340/10.1 |
| 2010/0123559 | A1 | * | 5/2010 | Wilkinson et al. | 340/10.4 |

* cited by examiner

*Primary Examiner* — Nam V Nguyen
(74) *Attorney, Agent, or Firm* — Medley, Behrens & Lewis LLC; Nathan T. Lewis

(57) ABSTRACT

Systems and methods are provided for monitoring a plurality of RFID tags. A receiver selection signal is sent along a receive path that includes a plurality of serially connected receivers. A receiver relays the receiver selection signal, listens for an RFID response signal, or operates in a standby mode based on the receiver selection signal. A transmitter selection signal is sent along a transmit path that includes a plurality of serially connected transmitters. A transmitter relays the transmitter selection signal, transmits an identification impulses, or operates in a standby mode based on the transmitter selection signal. The identification impulse is transmitted from the selected transmitter and an RFID response signal is received at the selected receiver.

15 Claims, 27 Drawing Sheets

380

| Time Unit | 1 | 2 | 3 | 4 | 5 | 6 | 7 | 8 | Mode |
|---|---|---|---|---|---|---|---|---|---|
| 1 | On | Off | Off | Off | Off | Off | Off | Off | EPC |
| 2 | On | Off | Off | Off | Off | Off | Off | Off | GOL |
| 3 | Off | On | Off | Off | Off | Off | Off | Off | EPC |
| 4 | Off | On | Off | Off | Off | Off | Off | Off | GOL |
| 5 | Off | Off | On | Off | Off | Off | Off | Off | EPC |
| 6 | Off | Off | On | Off | Off | Off | Off | Off | GOL |
| 7 | Off | Off | Off | On | Off | Off | Off | Off | EPC |
| 8 | Off | Off | Off | On | Off | Off | Off | Off | GOL |
| 9 | Off | Off | Off | Off | On | Off | Off | Off | EPC |
| 10 | Off | Off | Off | Off | On | Off | Off | Off | GOL |
| 11 | Off | Off | Off | Off | Off | On | Off | Off | EPC |
| 12 | Off | Off | Off | Off | Off | On | Off | Off | GOL |
| 13 | Off | Off | Off | Off | Off | Off | On | Off | EPC |
| 14 | Off | Off | Off | Off | Off | Off | On | Off | GOL |
| 15 | Off | Off | Off | Off | Off | Off | Off | On | EPC |
| 16 | Off | Off | Off | Off | Off | Off | Off | On | GOL |

| Time Unit | Antenna 1 | 2 | 3 | 4 | 5 | 6 | 7 | 8 | Mode |
|---|---|---|---|---|---|---|---|---|---|
| 1 | On | Off | Off | Off | Off | Off | Off | Off | EPC |
| 2 | Off | On | Off | Off | Off | Off | Off | Off | EPC |
| 3 | Off | Off | On | Off | Off | Off | Off | Off | EPC |
| 4 | Off | Off | Off | On | Off | Off | Off | Off | EPC |
| 5 | Off | Off | Off | Off | On | Off | Off | Off | EPC |
| 6 | Off | Off | Off | Off | Off | On | Off | Off | EPC |
| 7 | Off | Off | Off | Off | Off | Off | On | Off | EPC |
| 8 | Off | Off | Off | Off | Off | Off | Off | On | EPC |
| 9 | On | Off | Off | Off | Off | Off | Off | Off | GOL |
| 10 | Off | On | Off | Off | Off | Off | Off | Off | GOL |
| 11 | Off | Off | On | Off | Off | Off | Off | Off | GOL |
| 12 | Off | Off | Off | On | Off | Off | Off | Off | GOL |
| 13 | Off | Off | Off | Off | On | Off | Off | Off | GOL |
| 14 | Off | Off | Off | Off | Off | On | Off | Off | GOL |
| 15 | Off | Off | Off | Off | Off | Off | On | Off | GOL |
| 16 | Off | Off | Off | Off | Off | Off | Off | On | GOL |

| Time Unit | Antenna | | | | | | | |
|---|---|---|---|---|---|---|---|---|
| | 1 | 2 | 3 | 4 | 5 | 6 | 7 | 8 |
| 1 | ON | Off | Off | Off | Off | Off | Off | Off |
| 2 | REP | ON | Off | Off | Off | Off | Off | Off |
| 3 | REP | REP | ON | Off | Off | Off | Off | Off |
| 4 | REP | REP | Off | ON | Off | Off | Off | Off |
| 5 | REP | REP | REP | REP | ON | Off | Off | Off |
| 6 | REP | REP | REP | REP | REP | ON | Off | Off |
| 7 | REP | REP | REP | REP | REP | REP | ON | Off |
| 8 | REP | REP | REP | REP | REP | REP | REP | ON |

| Voltage Level | Antenna | | | | | | | |
|---|---|---|---|---|---|---|---|---|
| | 1 | 2 | 3 | 4 | 5 | 6 | 7 | 8 |
| 1 | EPC | Off | Off | Off | Off | Off | Off | Off |
| 2 | GOL | Off | Off | Off | Off | Off | Off | Off |
| 3 | REP | EPC | Off | Off | Off | Off | Off | Off |
| 4 | REP | GOL | Off | Off | Off | Off | Off | Off |
| 5 | REP | REP | EPC | Off | Off | Off | Off | Off |
| 6 | REP | REP | GOL | Off | Off | Off | Off | Off |
| 7 | REP | REP | REP | EPC | Off | Off | Off | Off |
| 8 | REP | REP | REP | GOL | Off | Off | Off | Off |
| 9 | REP | REP | REP | REP | EPC | Off | Off | Off |
| 10 | REP | REP | REP | REP | GOL | Off | Off | Off |
| 11 | REP | REP | REP | REP | REP | EPC | Off | Off |
| 12 | REP | REP | REP | REP | REP | GOL | Off | Off |
| 13 | REP | REP | REP | REP | REP | REP | EPC | Off |
| 14 | REP | REP | REP | REP | REP | REP | GOL | Off |
| 15 | REP | REP | REP | REP | REP | REP | REP | EPC |
| 16 | REP | REP | REP | REP | REP | REP | REP | GOL |

FIG. 27

SYSTEMS AND METHODS FOR CONTROLLING SERIALLY CONNECTED TRANSMITTERS IN RFID TAG TRACKING

CROSS-REFERENCE TO RELATED APPLICATIONS

This application claims priority to U.S. Provisional Application No. 61/164,095 filed Mar. 27, 2009, entitled "Systems and Methods for Controlling Serially Connected Transmitters In Dual-Protocol RFID Tag Tracking," the entirety of which is herein incorporated by reference.

This document is related to PCT Application No. PCT/US2005/037138, entitled "Distributed Antenna Array with Centralized Data Hub for Determining Presence and Location of RF Tags," filed Oct. 18, 2005, U.S. Pat. No. 6,951,305, entitled "Advertising Compliance Monitoring System," filed Mar. 20, 2003, and U.S. Pat. No. 7,423,516, entitled "Systems and Methods for Approximating the Location of an RFID Tag," filed May 4, 2006, the entirety of each of which is herein incorporated by reference.

TECHNICAL FIELD

This document relates generally to radio-frequency identification and more particularly to radio-frequency identification transmitter/receiver architectures.

BACKGROUND

The use of electronic product code (EPC) tags is expanding on a global basis. EPC tag cost is dropping, and EPC performance continues to periodically improve. Passive EPC tags acquire all required energy from an RF identification impulse signal sent by a reader module, while battery assisted tags, such as battery assisted tags from Goliath Solutions, LLC, utilize energy from an attached battery in generating a response to a received identification impulse signal. Identification impulse energy declines with the square of the distance from the reader module. Physics of tag sensitivity and strict regulations regarding maximum reader/antenna power output combine to produce limits as to the distance a passive EPC or battery assisted tag can be located and read from a given antenna.

FIG. 1 depicts an example plot of the received power of an identification impulse signal at a passive EPC tag versus the distance of the tag from the reader module. A tag threshold is included at −18 dBm as a dashed line, corresponding to the current state of the art. The tag threshold sensitivity is a key determinant of the maximum distance from the reader that a passive EPC tag may be read. Under current FCC regulations and technology, the maximum distance from a reader that a passive EPC may be read is about 12.5 meters under very good conditions. Battery assisted tags may be effective at further distances because the transmitted identification impulse signal need only reach the tag with enough power to be read by the tag, as the response may be assisted by the attached battery. Despite the added coverage distance, which may be several times the effective passive EPC distance, many choose to utilize the passive EPC tags due to their reduced cost and size, as well as their potential for use with other applications that rely on standard reader protocols.

EPC RF interference with and from other RF systems has also been a substantial difficulty in EPC system design. Lighting, cell phones, inventory scanner guns, and even nearby EPC readers and tags have been found to diminish EPC system performance. High reliability of tag reading is important because even at a high accuracy rate (e.g., 90%) the probability of correctly identifying a number of consecutive reads (e.g., 3) correctly may be rather small (e.g., 90%*90%*90%=73%). Because of variances in the size and layout of different locations where RFID systems are to be implemented, which may result in very different or continually changing RF environments in which to operate, expensive RF experts and RF monitoring equipment has often been required in implementing a cost-effective EPC tracking system that is able to support a high enough accuracy rate to be worth the costs of implementing.

To combat the high costs of EPC tracking system implementation, the scope and goals of tracking systems are often simplified to mitigate the above-described RF environment difficulties. For example, most EPC applications to date have been limited to a relatively small number of readers, such as at distribution "pinch-points" (e.g., loading docks), where EPC tags in cases and pallets passing through the pinch-point may be monitored. This type of system design limits the space between reader antennas and tags through deliberate placement of readers and antennas along a small number of predetermined paths of tag travel.

FIG. 2 depicts a prior art EPC RFID reader unit. The reader unit 22 includes several RF ports 24 that are dedicated transmit or receive ports. The ports 24 may also be full duplex RF ports, where the reader unit 22 may transmit and receive simultaneously on the same port. While such a system may be effective in monitoring EPC tags in a limited scope, such as the pinch-point monitoring described above, such a system may not be cost effective in broader area RFID monitoring, where a large number of expensive reader units 22 would be required to cover the desired area (e.g., a 10,000 square foot drug store may require 40 or more reader units 22 to implement full passive EPC tag monitoring coverage).

SUMMARY

In accordance with the teachings herein, systems and methods are provided for monitoring a plurality of RFID tags. The systems and methods may include a plurality of serially connected receivers along a receive path, where each of the serially connected receivers are configured to: relay a received receiver selection signal when a receiver selection signal identifies a selected receiver as being further along the receive path than the serially connected receiver; listen for an RFID response signal when the receiver selection signal identifies the serially connected receiver as being the selected receiver; and operate in a standby mode when the receiver selection signal identifies the selected receiver as being closer on the receive path than the serially connected receiver. The systems and methods may further include a reader responsive to a plurality of receive paths that include a plurality of serially connected receivers on each path, where the reader is configured to send the receiver selection signal along a selected receive path, and the receiver selection signal identifies one of the plurality of serially connected receivers along the selected receive path as the selected receiver for listening for an RFID response signal.

As another example, a system and method for monitoring a plurality of RFID tags may include a plurality of serially connected transmitters along a transmit path, where each of the serially connected transmitters configured to: relay a received transmitter selection signal when a transmitter selection signal identifies a selected transmitter as being further along the transmit path than the serially connected transmitter; transmit an identification impulse when the transmitter selection signal identifies the serially connected transmitter as being the selected transmitter; and operate in a standby mode when the transmitter selection signal identifies the selected transmitter as being closer on the transmit path than the serially connected transmitter. The systems and methods may further include a reader responsive to a plurality of transmit paths that include a plurality of serially connected transmitters on each path, the reader being configured to send the transmitter selection signal along a selected transmit path, where the transmitter selection signal identifies one of the plurality of serially connected transmitters along the selected transmit path as the selected transmitter for transmitting the identification impulse.

BRIEF DESCRIPTION OF THE DRAWINGS

FIG. 23 depicts a truth table utilized by a transmitter unit or a receiver unit in a set of serially connected units to determine the proper mode and protocol for operation.

FIG. 24 depicts a second example truth table utilized by a transmitter unit or a receiver unit in a set of serially connected units to determine the proper mode and protocol for operation.

FIG. 26 depicts a fourth example truth table utilized by a transmitter unit or a receiver unit in a set of serially connected units to determine the proper mode for operation.

FIG. 27 depicts a fifth example truth table utilized by a transmitter unit or a receiver unit in a set of serially connected unit that relies upon a voltage level for determining a critical value.

DETAILED DESCRIPTION

To date, loss of RF energy to power passive EPC tags over distance has been a major impediment to monitoring EPC tags in retail environments. Further, signal loss through extended cable length has been a major determinant of the distance an antenna can reside from an EPC reader and hence, has limited the number of antennas associated with a given reader. These factors, combined with the expense of procuring and installing EPC readers, have prevented open monitoring of voluminous retail selling areas. While pinch-point and other close proximity techniques (e.g., handheld reader scanning) are useful in their narrow realms, it may be desirable to monitor RFID tags over a much larger area such as the inside of a drug store or other retail environment where the close proximity techniques are ineffective.

For example, it may be desirable to implement an in store display tracking system, where product displays are placed at the end of aisles and at other locations throughout the retail environment. Product displays may include integrated RFID tags that permit tracking of the presence and location of the displays within the retail environment. When merged with point-of-sale scanner data, the location of these product displays may be correlated with the sale data to assess the value of the merchandising materials. Store data (e.g., point-of-sale data, product display presence data, product display location data, etc.) may be used to generate alerts for managers or other personnel that identify programs and displays that are not being executed optimally. Data across stores may be aggregated to assess overall program effectiveness, which may be fed back to purchasing and production organizations to eliminate ineffective programs or serve as the basis for future enhancements. Product display data may also be beneficial for advertisers to monitor whether their in-store promotions, for which they are paying, are being properly implemented within the stores. Advertising compliance monitoring system details are included in U.S. Pat. No. 6,951,305, incorporated by reference herein.

As another example, RFID inventory tracking within the store may be beneficial in tracking product-on-hand for use in determination of optimum product reorder times to reduce inventory-on-hand and improve inventory turnover metrics. In-store EPC reads may be integrated with reads from other EPC readers located throughout the production and distribution channel to improve efficiency or respond quickly to reorder opportunities. Improved data gathering about disposition of products in "the last 100 feet" of their distribution cycle may enable significant logistic gains.

Figure 3:
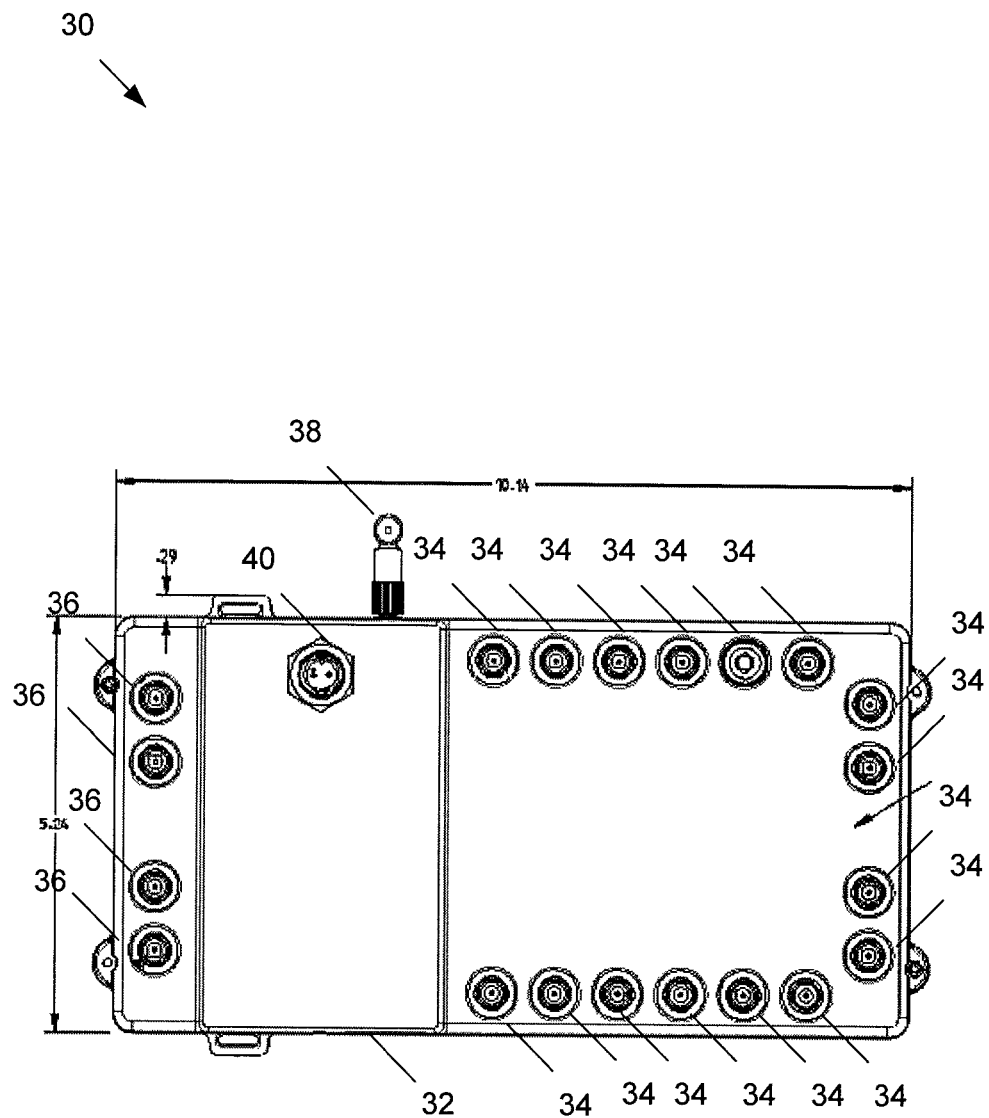
FIG. 3 depicts a top view of a large footprint RFID monitoring reader unit.

FIG. 3 depicts a top view of a large footprint RFID monitoring reader unit. A system incorporating the large footprint RFID monitoring reader unit 32 may track RFID tags in environments where the RFID tag flow is not predefined. In contrast to pinch-point and other close proximity techniques that require known tag paths, a large footprint RFID monitoring system may cover larger areas such as retail environments, warehouses, etc.

Figure 1:
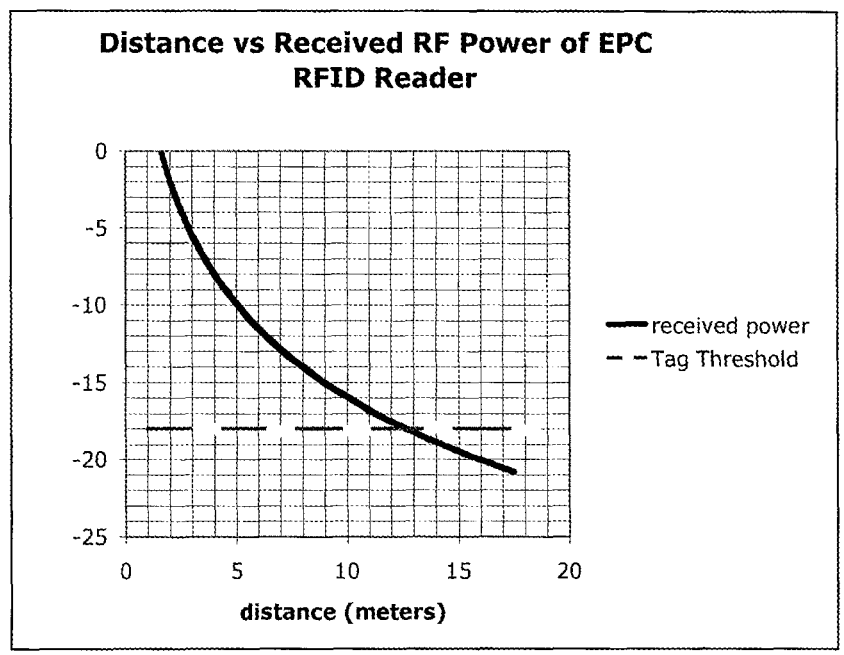
FIG. 1 depicts an example plot of the received power of an identification impulse signal at a passive EPC tag versus the distance of the tag from the reader module.
Figure 2:
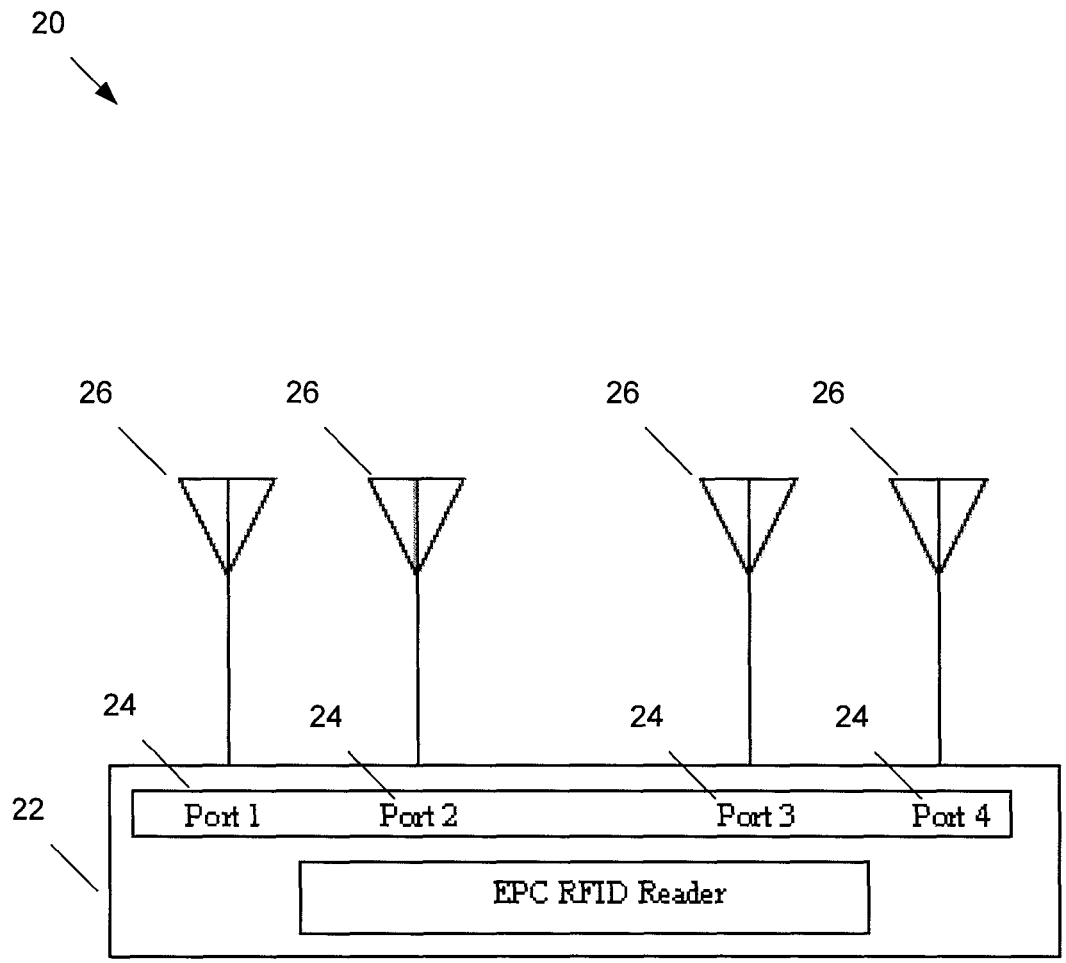
FIG. 2 depicts a prior art EPC RFID reader unit.

RFID monitoring reader units tend to be expensive. Reader units may contain significant system implementation logic, such as control logic for identification impulse transmission and RFID response receiving on different responsive antennas. The reader unit may also contain significant volatile and/or non-volatile memory for temporary or long term data storage. As noted above, implementing an RFID monitoring solution using the prior art RFID reader of FIG. 1 may require 40 or more reader units to adequately monitor a 10,000 square foot environment. A 40 reader requirement may be cost prohibitive, and without proper scan synchronization, the RF interference generated by the reader units may make the RF environment unusable for other devices as well as the readers themselves.

The large footprint RFID monitoring reader unit 32 of FIG. 3 depicts an example reader 32 in a modular RFID tag monitoring environment that may significantly reduce costs by greatly reducing the number of required reader units. The RFID monitoring reader 32 includes 16 transmitter connection ports 34. Each transmitter connection port 34 may be connected to an individual remote transmitter unit or a series of serially connected transmitter units, as will be described further herein. Connections may be made to the transmitter connection ports 34 via coaxial cable or other cabling means. The RFID monitoring reader 32 further includes four receiver connection ports 36. Each receiver connection port 36 may be connected to an individual remote receiver unit or a series of serially connected receiver units, as will also be described further herein. Connections may be made to the receiver connection ports 36 via coaxial cable or other cabling means. The RFID monitoring reader also may include an antenna 38 as well as a hardwire external connection port 40. The antenna 38 and/or the hardwire connection port 40 may be utilized for communications between the RFID monitoring reader 32 and other reader units, an external data store, or a reader controller computer at a higher level of a reader hierarchy.

Figure 4:
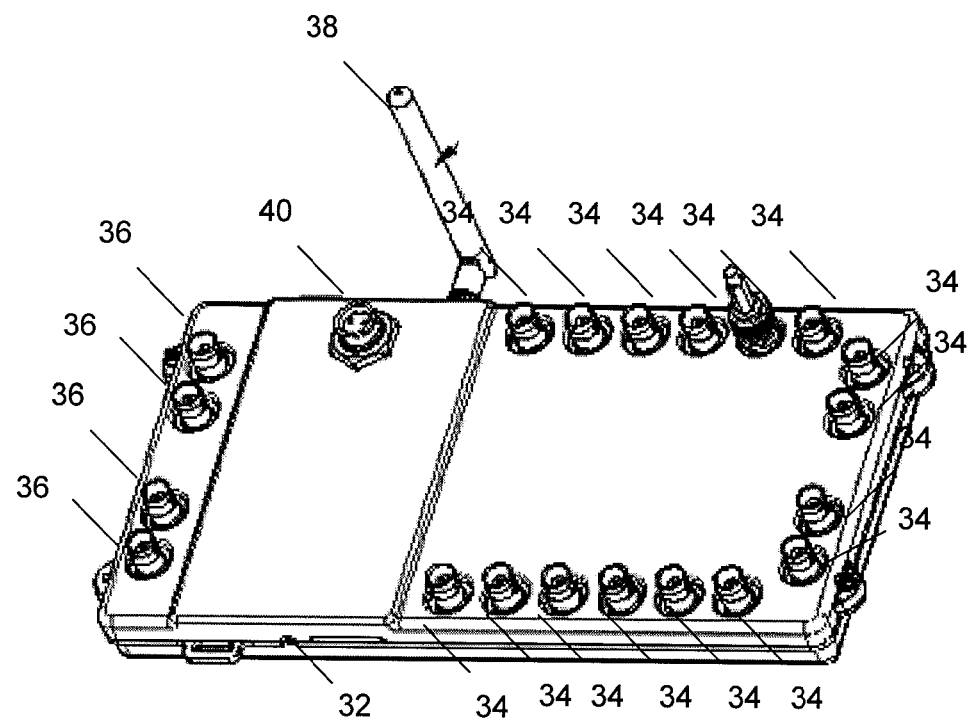
FIG. 4 depicts an angled top view of the large footprint RFID monitoring reader unit.
Figure 5:
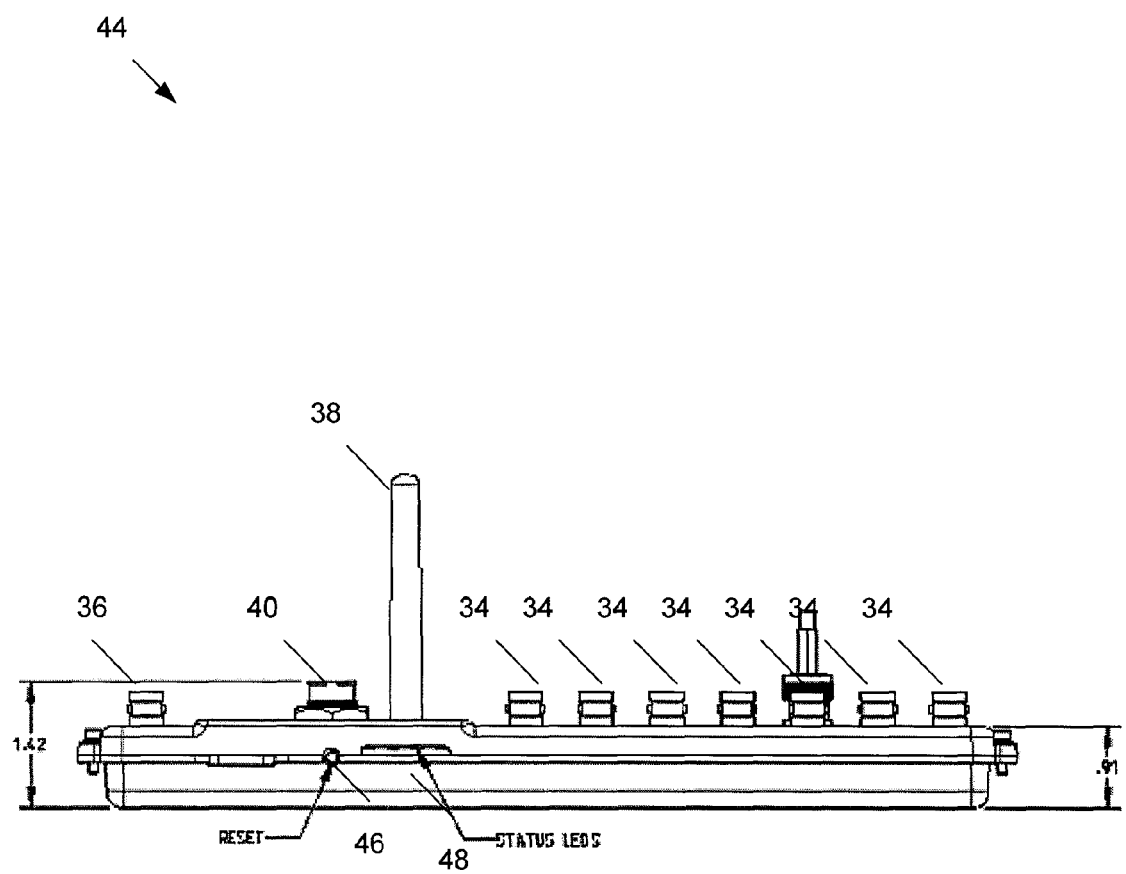
FIG. 5 depicts a side view of the large footprint RFID monitoring reader unit.

FIG. 4 depicts an angled top view of the large footprint RFID monitoring reader unit. The angled top view 42 depicts the RFID reader unit 32 that includes 16 transmitter connection ports 34 and four receiver connection ports. Also shown are an integrated antenna 38 and hardwire external connection port 40 for communications with outside control or data storage units. FIG. 5 depicts a side view of the large footprint RFID monitoring reader unit. FIG. 5 depicts a plurality of transmitter connection ports 34 and a receiver connection port 36. The side view further depicts the antenna 38 and hardwire external connection port 40 for external communications. The side view also depicts a reset button 46 and a series of status LEDs 48.

Figure 6:
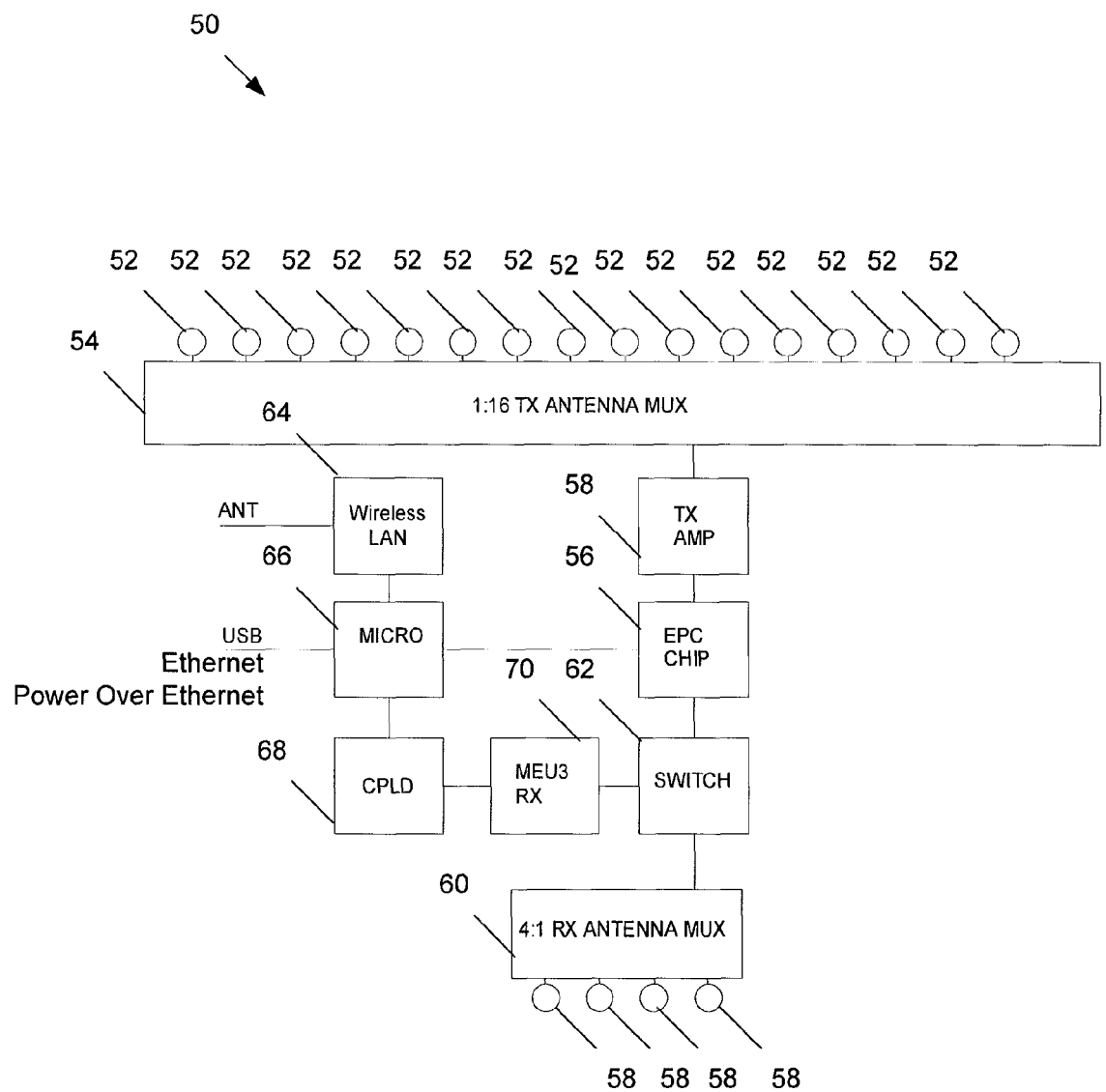
FIG. 6 is a block diagram depicting internal components of an RFID monitoring reader unit.

FIG. 6 is a block diagram depicting internal components of an RFID monitoring reader unit 50. The reader unit 50 includes 16 transmitter connection ports 52 responsive to a 1:16 transmitter antenna multiplexer 54. The transmitter multiplexer 54 propagates signals from an EPC chip 56 that are amplified at a transmitter amplifier 58. The EPC chip 56 may contain logic for selection of which of the transmitter connection ports 52 is to be activated. The EPC chip 56 may also provide commands on which of a series of serially connected transmitter units along a transmit path connected to a transmitter connection port 52 is to be the selected transmitter. The EPC chip 56 may further provide command data as to which of a plurality of RFID protocols is to be used in transmission of an identification impulse signal. The EPC chip 56 may further be responsive to a plurality of receiver connection ports 58 through a 4:1 receiver antenna multiplexer 60 and a switch 62. The EPC chip 56 may provide command data identifying which one or more or all of the receiver connection ports 58 are active for receiving RFID response data. The EPC chip 56 may also provide command data as to which of a series of serially connected receiver units along a receive path connected to a receiver connection port 58 is to be a selected receiver. A MEU3 receiver chip 70 may be included for providing command data to and receiving RFID response data from the transmitter connection ports 52 and the receiver connection ports 58. The MEU3 may contain instructions for managing communications according to a non-EPC protocol, such as communications with Goliath LLC battery assisted beacon backscatter tags. A Goliath battery assisted tag is described in PCT Application No. PCT/US2005/037138, incorporated by reference herein, specifically at FIG. 6. A switch 62 may regulate communications between the transmitter connection ports 52 and the receiver connection ports 58 with one of the EPC chip 56 and MEU3 receiver chip 70 depending on the current protocol mode. The RFID monitoring reader 50 may further include external connections elements such as an antenna module 64 and a USB or other protocol micro module 66 that enable connections between the RFID monitoring reader 50 and external hardware.

Figure 7:
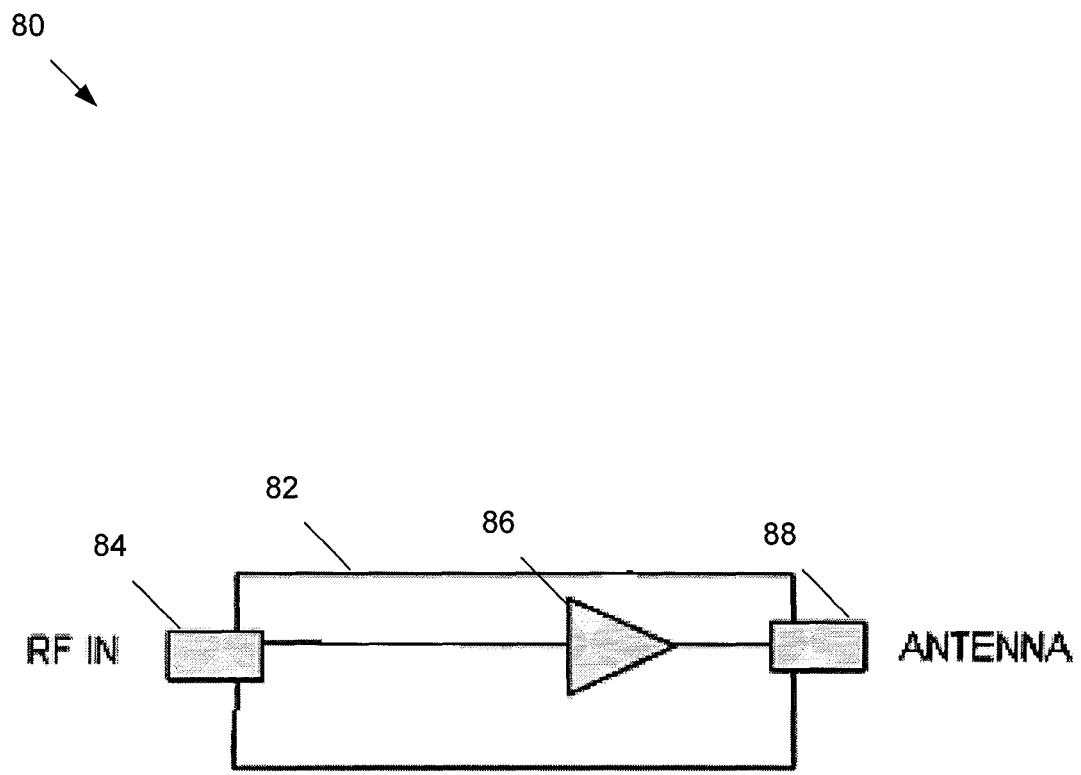
FIG. 7 is a block diagram of a stand-alone transmitter unit.

FIG. 7 is a block diagram of a stand-alone transmitter unit. Transmit commands may be received by the transmitter unit 82 at an RF input port 84 from an RFID monitoring reader via coaxial cable or other cabling means. The received command data may be amplified by an amplifier 86 before being output as an RFID identification impulse through an antenna 88. The stand-alone transmitter unit 82 may be connected to one of a plurality of transmitter connection ports on an RFID monitoring reader or may be connected at the end of a transmit path containing multiple transmitter units.

The command data received at the RF input 84 may include protocol identification data. The protocol identification data may identify a protocol by which the identification impulse is to be transmitted. For example, in a passive EPC mode, the identification impulse may be amplified by the high power amplifier 86 to the maximum allowable FCC power to reach the non-battery assisted EPC tags as far away from the transmitter unit 82 as possible. In contrast, in a battery assisted EPC mode, the amplifier 86 may amplify the identification impulse at a lower level, allowing the transmitter unit 82 to activate tags within the same radius as the passive EPC mode while offering a power usage savings. As noted above, battery assisted EPC tags may be activated at a much further distance from the transmitter unit 84 because the identification impulse is not relied upon for providing power for the RFID response signal. The battery assisted EPC mode identification impulse may also be amplified at the same level as the passive EPC mode by the amplifier 86 to potentially activate RFID tags at a greater radius than is possible for non-battery assisted tags.

Figure 8:
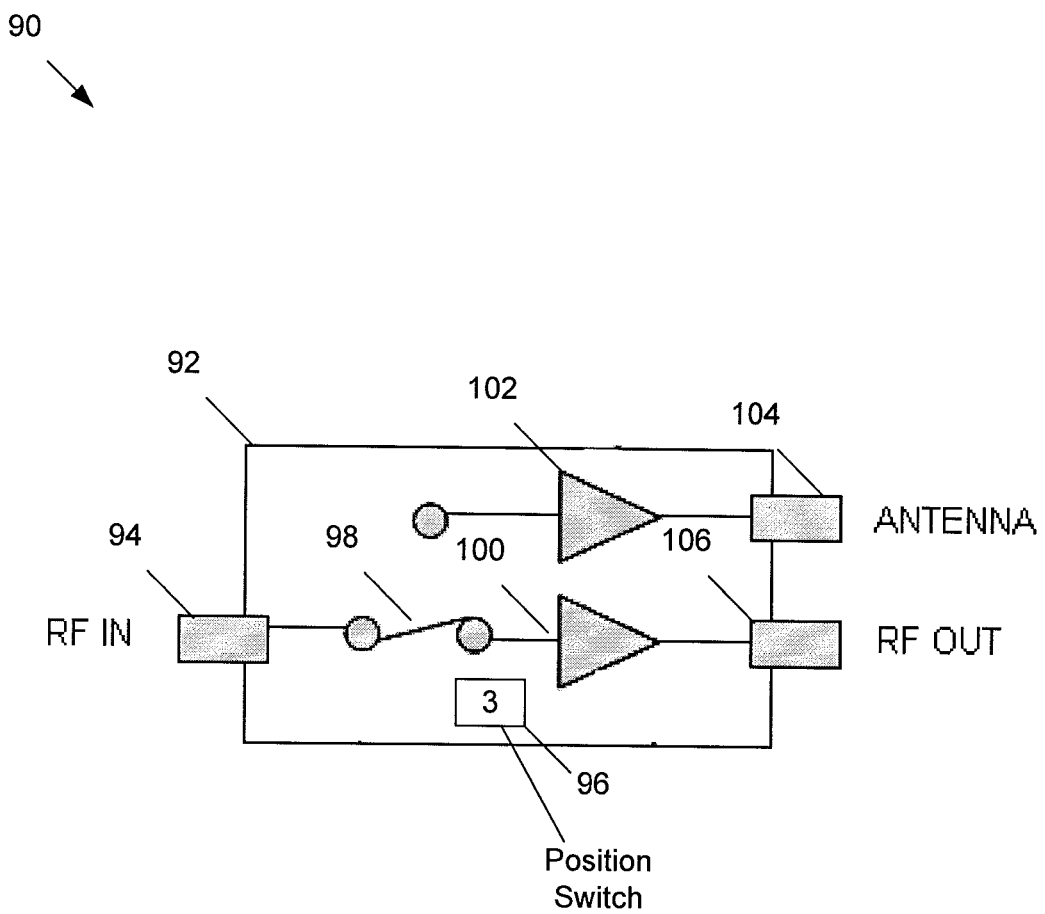
FIG. 8 is a block diagram depicting a transmitter unit for use in series of transmitter units along a transmit path.

FIG. 8 is a block diagram depicting a transmitter unit for use in a series of transmitter units along a transmit path. A transmit path may include a plurality of transmitter units similar to the unit depicted in FIG. 8 and may also include a stand-alone transmitter unit similar to the unit depicted in FIG. 7 at the end of the transmit path. Transmit command data is received at the transmitter unit 92 from an RFID monitoring reader at an RF input 94. The transmit command data includes data identifying which transmitter of a series of serially connected transmitters along a transmit path is the selected transmitter for transmitting the identification impulse. The transmitter unit 92 is aware of its position on the transmit path through a position switch 96 or other position identification means or via a position self-detection algorithm. In the example of FIG. 8, the transmitter unit is set via a switch 96 as the third transmitter along the transmit path. Upon receiving transmit command data via the RF input 94, a comparison is made between the transmitter selection data in the received transmit command data and the transmitter unit position. If the selected transmitter, identified by the transmitter selection data, is further down the transmit path (e.g., the fifth transmitter is selected in the example of FIG. 8), then the transmitter unit functions in a command repeater mode, as shown in FIG. 8.

In a repeater mode, an RF switch is toggled to enable the transmit command data to be passed to the next transmitter unit along the transmit path, as shown at 98. An amplifier 100, may amplify the transmit command data to compensate for losses and distortions along inter-transmitter unit linkages and within transmitter units themselves. The amplifier 100 may also provide other conditioning to the received transmit command data signal. The amplified transmit command data signal is then forwarded to the next serially connected transmitter unit along the transmit path via an RF output 106. The amplifier 100 may amplify the transmit command data at a higher or lower power level than the amplifier 102 used in a transmit mode in conjunction with an antenna 104. In an alternate configuration, a same amplifier may be used for amplification in all transmitter modes. The amplifiers 100, 102 may include a control loop for restoring the received signal to a defined level via an adjustable gain. Such an adjustable gain may be utilized to ensure that all propagated and transmitted signals remain within FCC regulations.

Figure 9:
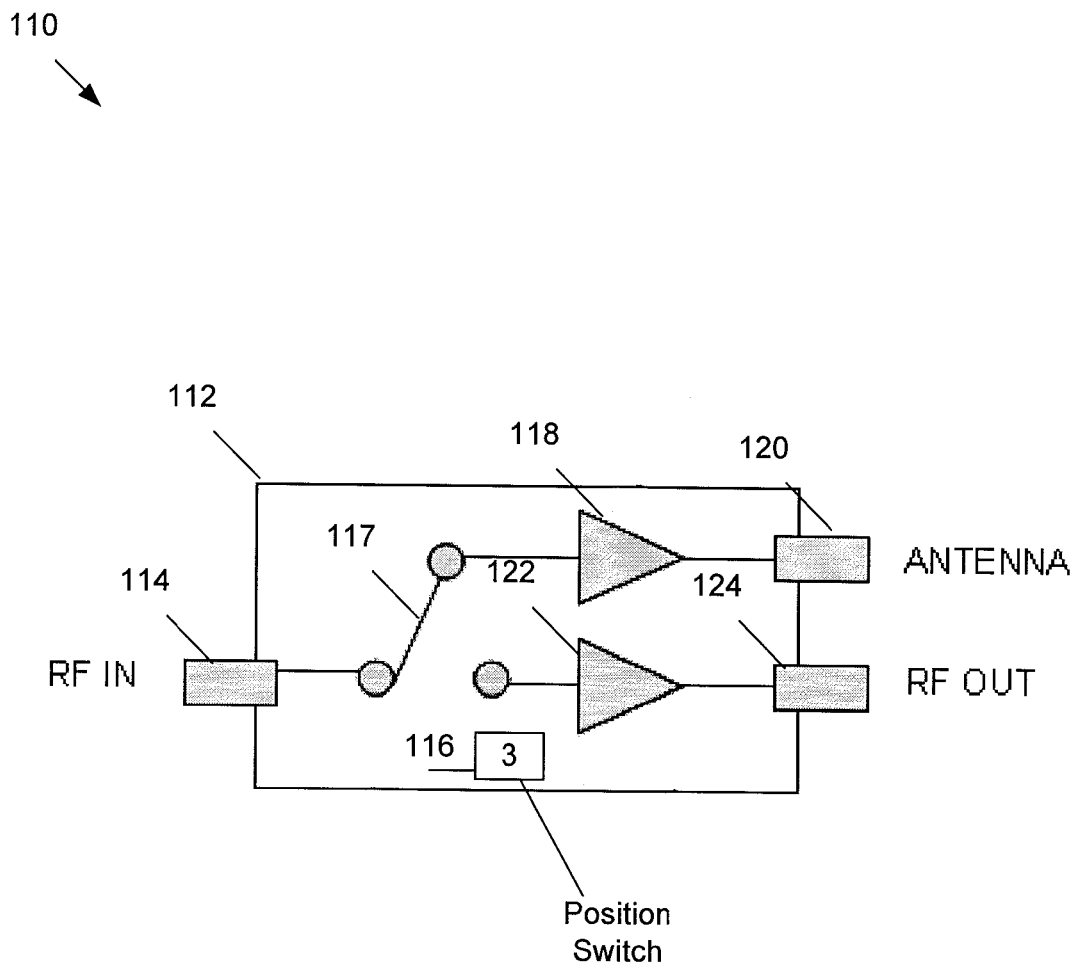
FIG. 9 is a block diagram depicting a transmitter unit in series of transmitter units along a transmit path in transmit mode.

FIG. 9 is a block diagram depicting a transmitter unit in a series of transmitter units along a transmit path in transmit mode. The transmitter unit 112 receives transmit command data via an RF input 114. The transmitter unit 112 has been identified as the third transmitter unit along the transmit path via a switch setting 116. In the example of FIG. 9, command data has been received via the RF input 114 from an RFID monitoring reader identifying the third transmitter along the transmit path as being the selected transmitter. This command data may be sent via a variety of methods including a time sensitive pulse, as will be described with reference to FIGS. 21 and 22, herein below, a voltage level, as will be described with reference to FIG. 26, herein below, or other methods such as the inclusion of one or more modulated tones identifying the selected transmitter. Upon recognition that the transmitter unit 112 is the selected transmitter, an RF switch 117 is toggled, activating an amplifier 118. The amplifier 118 may amplify the identification impulse up to a maximum allowed by FCC regulations or to another level above or below the regulations level. The identification impulse may then be broadcast via the antenna 120. In an alternative configuration, the transmit command data may be transmitted to later transmitter units beyond the selected transmitter via the amplifier 122 and the RF output 124. Transmit command data to transmitter units beyond the selected transmitter may be amplified at a nominal amplifier 122 level or at a lower standby level or not at all. Later transmitter units along the transmit path may similarly pass the transmit command data or not pass the transmit command data at all in a standby mode.

In addition to a switch 116 or other mechanical position indicator, a transmitter unit 112 may detect its position in the transmit path by measuring the strength of a calibration signal that the transmitter unit 112 receives and propagates via the RF output 124. For example, the RF output amplifier 122 may have an operational gain, used when the transmit path is being used to send an identification impulse or a transmitter selection signal, and a configuration gain, used when the transmit path is in an enumerate mode for transmitter units to identify their position in the transmit path. In the enumerate mode, a carrier signal is transmitted along the transmit path, and each transmitter unit applies the configuration gain to the carrier signal and propagates the carrier signal to a next transmitter unit in the transmit path. The transmitter units may then measure the level of the carrier signal at the unit to determine the transmitter unit's position. For example, the transmitter unit may compare a measured carrier signal level with a table to determine the transmitter unit's position.

Figure 10:
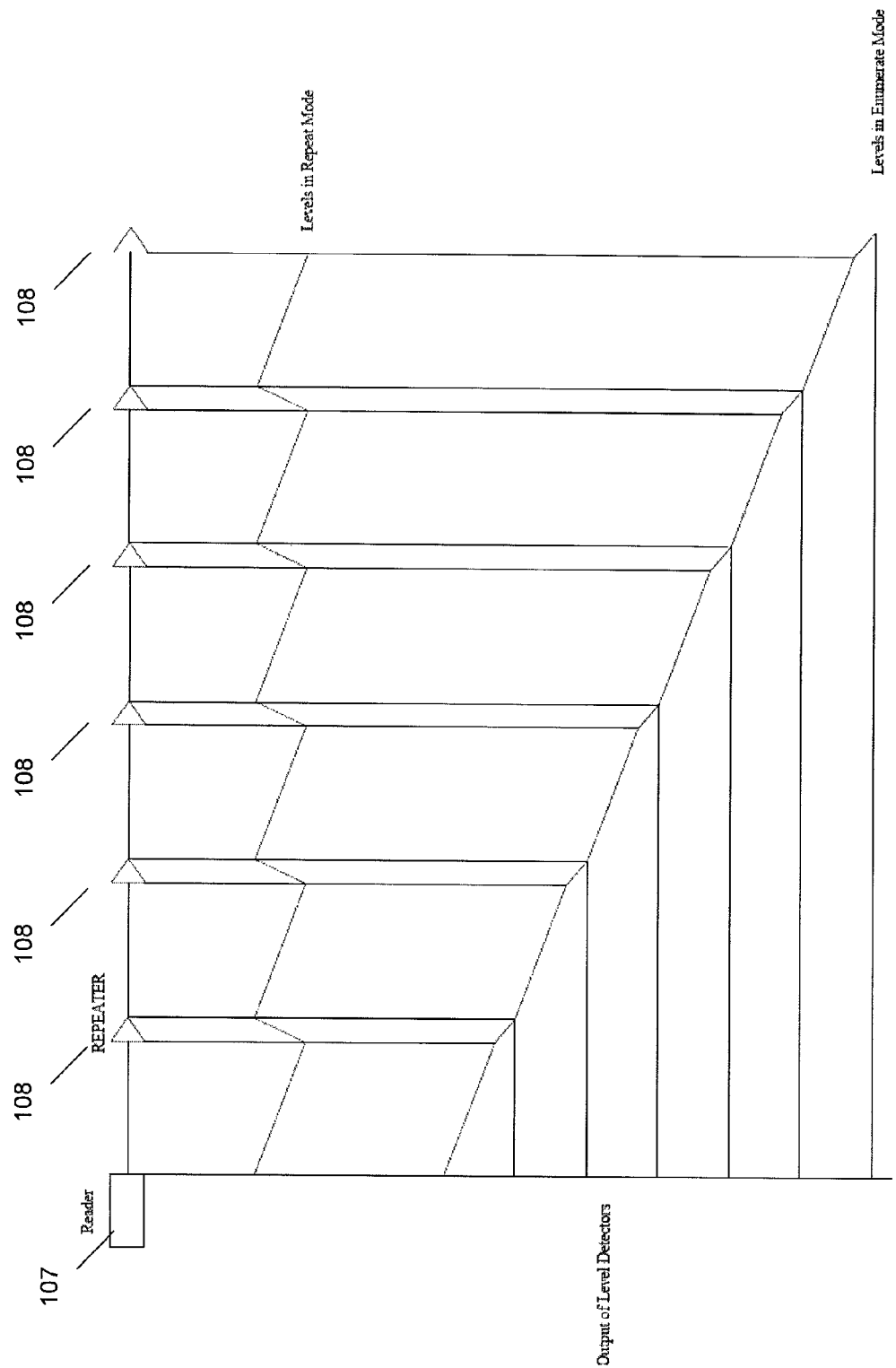
FIG. 10 is a graph depicting the strength of a signal sent from a reader unit and relayed by a plurality of transmitter units that include repeaters.

FIG. 10 is a graph depicting the strength of a signal sent from a reader unit 107 and relayed by a plurality of transmitter units 108 that include repeaters. As shown in the top plot, when the repeaters in the serially connected transmitter units 108 relay a signal using an operational gain, the signal levels in that repeat mode remain relatively constant. In contrast, when a calibration signal is transmitted using a lesser configuration gain in an enumerate mode, the configuration signal level degrades at each transmitter unit 108 as shown in the bottom plot. By measuring the strength of the configuration signal level at a transmitter unit 108 in an enumerate mode, the transmitter unit 108 can determine its position in the set of serially connected transmitter units 108.

As an example, a fabrication factory may perform test and calibration measurements on each transmitter unit. During this process, two values may be stored in a memory at the transmitter unit: one representing a value needed to produce a +8 dBm output (DAC1) and one value needed to produce a +1 dBm output (DAC2). The DAC1 value is used during normal operation in repeater mode and DAC2 is used in the enumeration mode. The following table displays typical values of RF level outputs and DAC2 values with six antenna operating.

TABLE 1

Typical RF Level Outputs and DAC Values

| Station | RF output level (dBm) | DAC2 values |
|---------|----------------------|-------------|
| 1 | +1 | 124 |
| 2 | −6 | 169 |
| 3 | −13 | 214 |
| 4 | −20 | 260 |
| 5 | −27 | 305 |
| 6 | −34 | 351 |

If an antenna connected to an RF port is commanded to perform enumeration and its DAC value measures 173 counts, then the antenna would determine its position to be 2, based on the closeness of 173 to the DAC2 value of 169 for station 2 in the table. If another antenna has a DAC value that measures 301 counts, then that antenna would determine its position to be 5.

Figure 11:
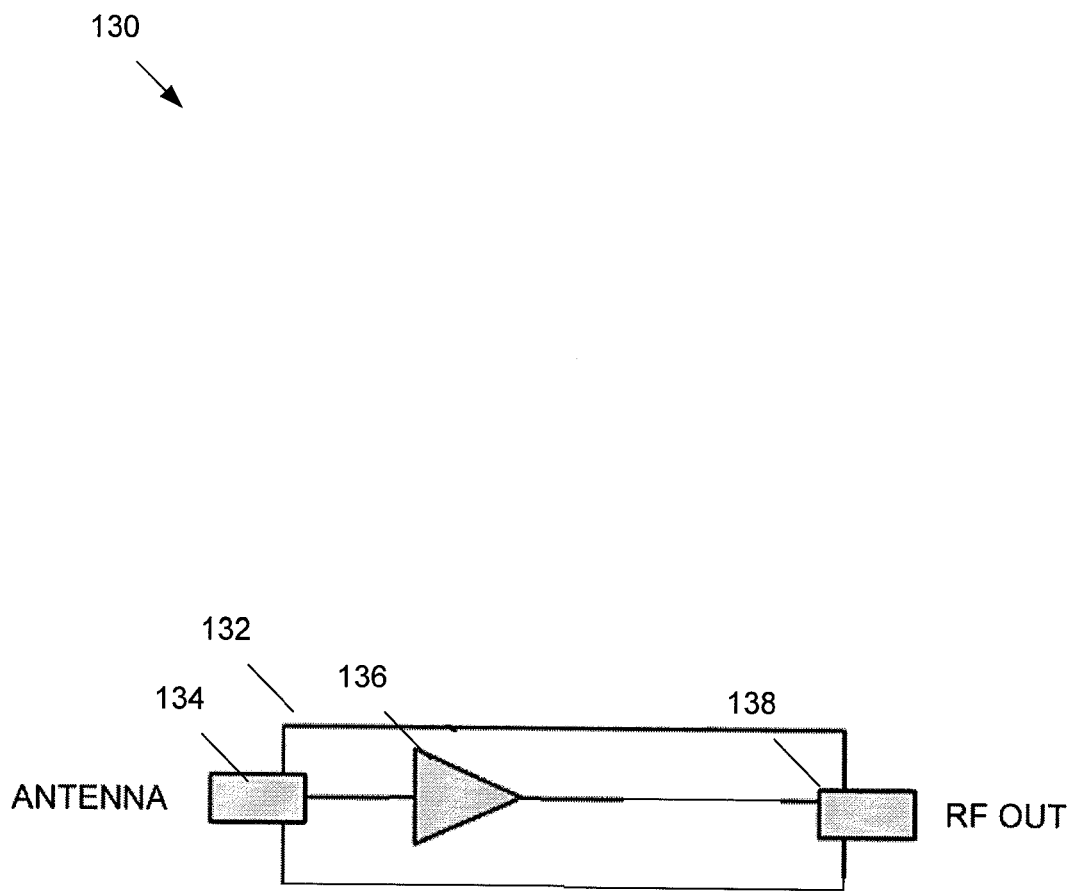
FIG. 11 is a block diagram depicting a stand-alone receiver unit.

FIG. 11 is a block diagram depicting a stand-alone receiver unit. The stand-alone receiver unit 132 listens for RFID responses via an antenna 134. Signals detected by the antenna 134 may be amplified by an amplifier 136 before being propagated from the stand-alone receiver unit 132 via an RF output port 138. The stand-alone receiver unit 132 may be connected to a receiver connection port on an RFID monitoring reader or may be included at the end of a receive path including multiple receive units.

Figure 12:
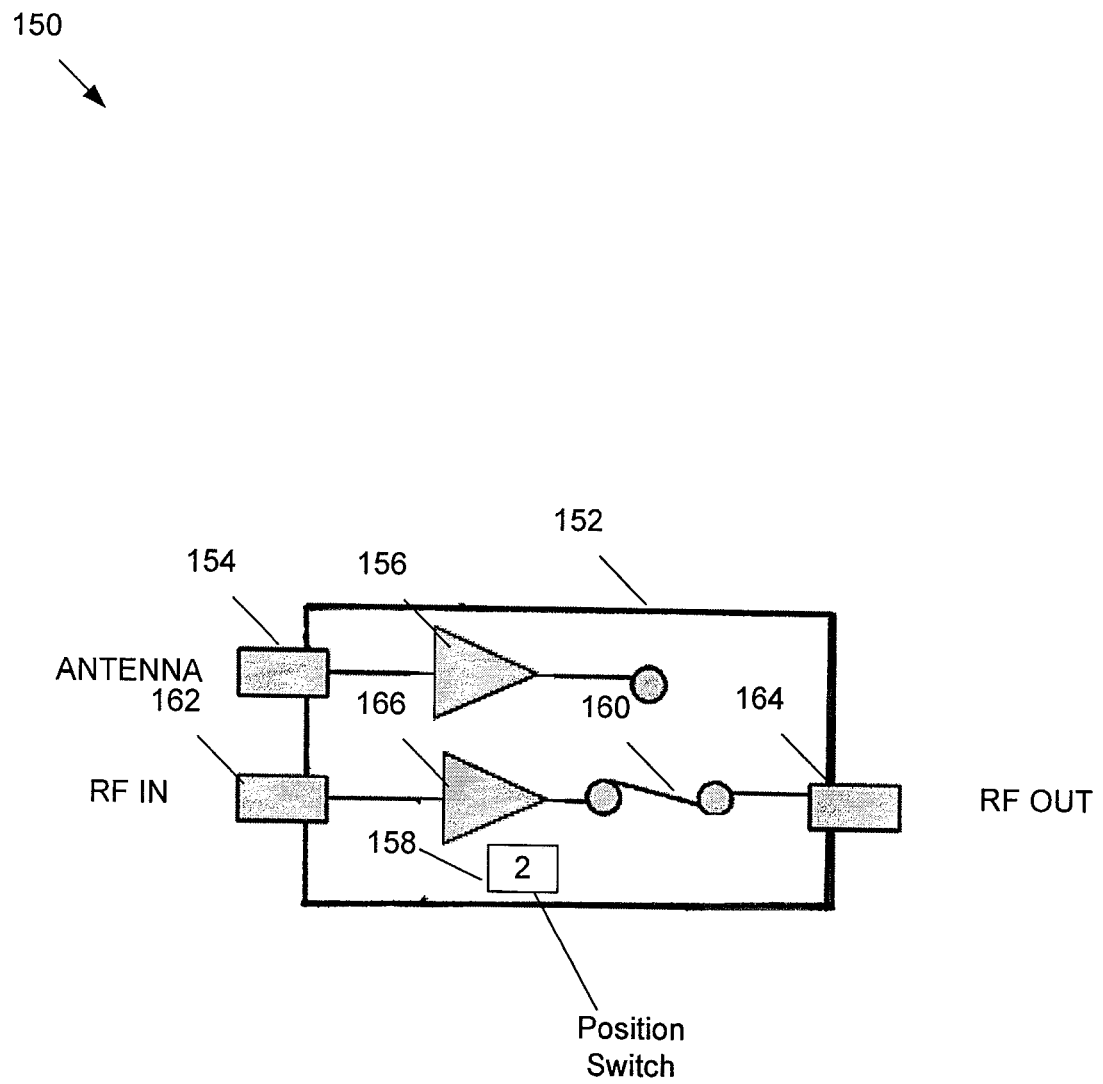
FIG. 12 is a block diagram depicting a receiver unit for use in a receive path with a plurality of serially connected receiver units.

FIG. 12 is a block diagram depicting a receiver unit for use in a receive path with a plurality of serially connected receiver units. The receiver unit includes an antenna 154 connected to an amplifier 156 for amplifying signals detected by the antenna 154. A position switch 158 identifies the position of the receiver unit 152 along a receive path that may include multiple receiver units. In the example of FIG. 12, the receiver unit 152 is identified as the second receiver in the receive path. Identification of the position of a receiver unit may be implemented in a variety of ways including self-position-identification procedures that may not require a manual identification. In the example of FIG. 12, receive command data has identified a selected receiver unit as being further along the receive path than the receiver unit 152. Upon receiving such receive command data, the receiver unit is configured to a repeater mode via toggling of an RF switch 160. Toggling the RF switch 160 in a repeater mode enables propagation of response data from receiver units later in the receive path received at the RF input port 162 and output via the RF output port 164 as well as the propagation of receive command data from the RFID monitoring reader to later receiver units. An amplifier 166 may be included along the repeater path to amplify and/or condition data signals received from the RF input port 162. The low power amplifier may include a control loop for restoring the received signal to a defined level via an adjustable gain.

Figure 13:
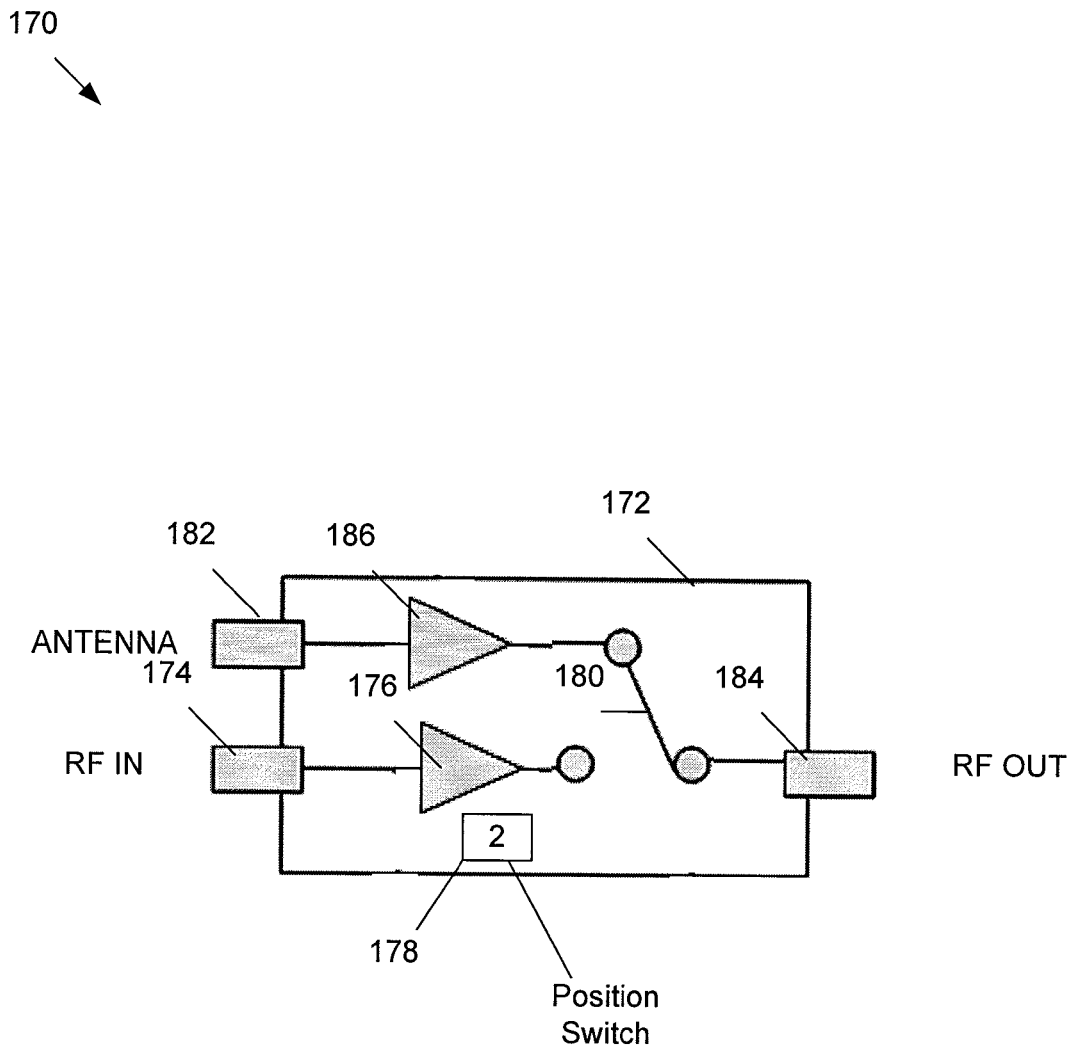
FIG. 13 is a block diagram depicting a receiver unit in a receive mode for use in a receive path with a plurality of receiver units.

FIG. 13 is a block diagram depicting a receiver unit in a receive mode for use in a receive path with a plurality of receiver units. The receiver unit 172 includes and RF input port 174 and an amplifier 176 for propagating signals from other receiver units further along a receive path when the receiver unit 172 is in a repeater mode. The receiver unit 172 includes a switch 178 for identifying the position of the receiver unit 172 on a receive path containing multiple receiver units. The receiver unit 172 is identified as being the second receiver unit on the receive path. Upon receiving receive command data identifying the second receiver unit 172 as the selected receiver, the RF switch 180 is toggled to place the receiver unit 172 in a receive mode. This enables RFID response data corresponding to RFID response signals received at the antenna 182 to be propagated to an RFID monitoring reader via the RF output port 184. The received RFID response signals may be amplified and conditioned by an amplifier 186 before transmission along the receiver path.

As an alternative to the switch 178 depicted in FIG. 13 or another mechanical position indicator, a receiver unit 172 may detect its position in the receive path via an enumeration mode similar to the enumeration mode described above with respect to the transmit unit and depicted in FIG. 10. In an enumeration mode, a carrier signal is propagated along the receive path. A receive unit 172 measures a level of the carrier signal at that receive unit 172. Based on the range in which that measured levels falls, the receive unit 172 identifies its position in the receive path.

Figure 14:
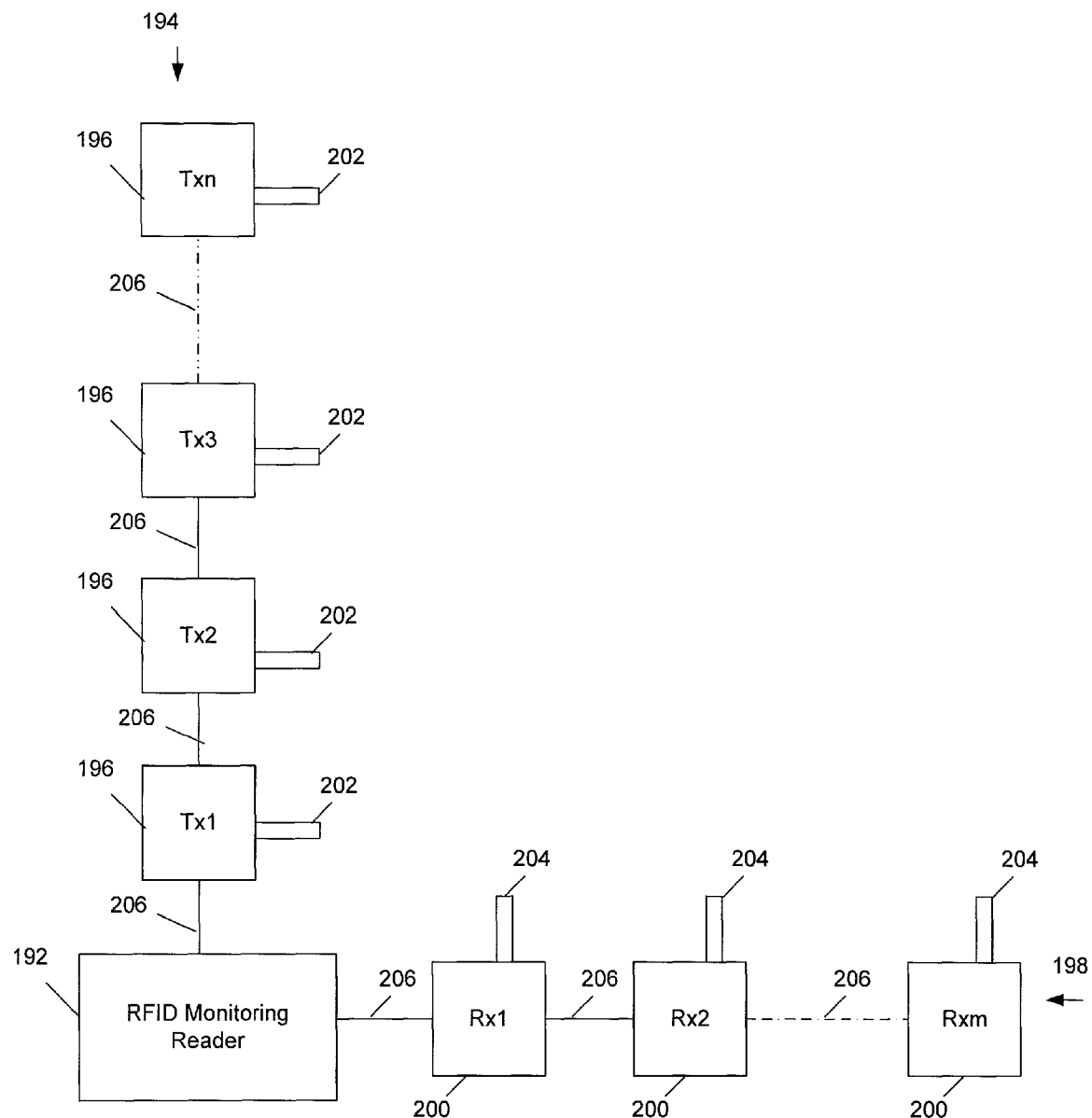
FIG. 14 is a block diagram depicting an RFID monitoring reader responsive to a transmit path having a plurality of serially connected transmitter units and a receive path having a plurality of serially connected receiver units.

FIG. 14 is a block diagram depicting an RFID monitoring reader 192 responsive to a transmit path 194 having a plurality of serially connected transmitter units 196 and a receive path 198 having a plurality of serially connected receiver units 200. Each of the transmitter units 196 includes an antenna 202. For example, a transmitter unit 196 may utilize a crossed dipole with a reflector, where each dipole is connected to a quadrature hybrid to provide circular polarization. As another example, a transmitter unit 196 may utilize two dipole antennas radiating sequentially enabling a determination of the axial orientation of the linear-polarity passive EPC tags by comparing received signal strength indications and read counts from each dipole. As a further example, an antenna can have one, two, or more components associated with its station (e.g., two orthogonal linear polarity elements may be utilized in each station to identify the orientation of a tag in an X-Y plane, where the resulting RSSI's and read counts are reported with each element along with a station number).

Each of the receiver units 200 also includes an antenna 204. For example, a receiver unit 200 may utilize a quadrifilar helix, having a range compensating pattern that allows higher gains at offset angles to bore sight with a circular polarization and good axial ratio on and off bore sight. As depicted in FIG. 14, up to n transmitter units and m receiver units may be included on a transmit path and receive path, respectively, as hardware capabilities may allow. For example, the number of transmitter units 196 and receiver units 200 may be limited by the amount of DC current that can be provided by the RFID monitoring reader 192, the maximum amount of DC current that the connecting cables 206 are able to carry, or limitations on signal quality and conditioning throughout the transmit and receive paths.

Figure 15:
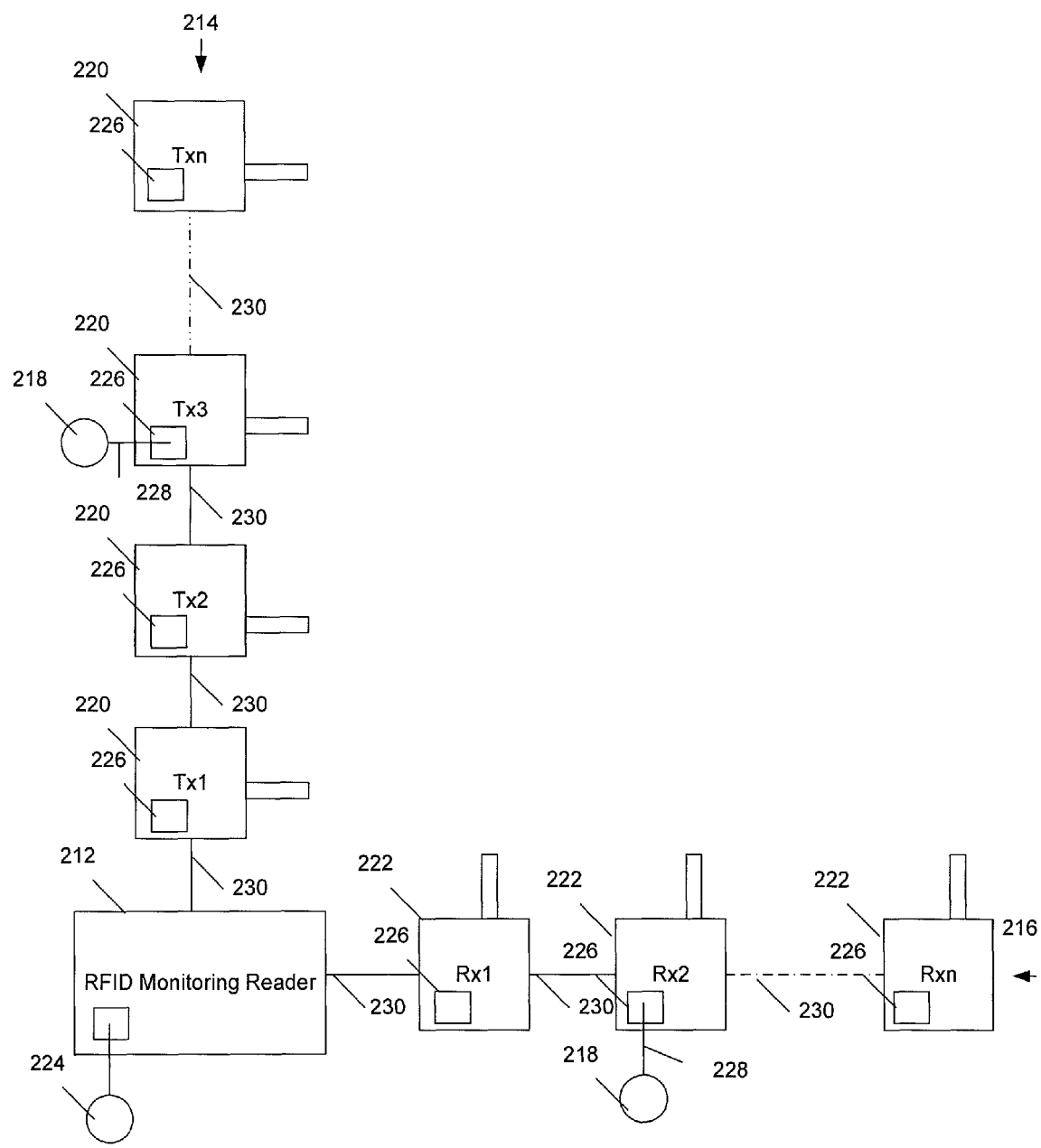
FIG. 15 is a block diagram depicting an RFID monitoring reader responsive to a transmit path and a receive path where transmitter units and receiver units are able to access supplemental power sources.

FIG. 15 is a block diagram depicting an RFID monitoring reader 212 responsive to a transmit path 214 and a receive path 216 where transmitter units 220 and receiver units 222 are able to access supplemental power sources 218. The RFID monitoring reader 212 may provide some of the necessary power to the transmitter units 220 on the transmit path 214 and the receiver units 222 on the receive path 216 from a first power source 224. Additionally, transmitter units 220 and receiver units 222 may include supplemental power access interfaces 226 for accessing supplemental power sources 218, as shown at 228. Transmitter units 220 and receiver units 222 accessing supplemental power sources 218 may propagate power from the supplemental power sources 218 to other units, such that only a limited number of units are connected to the supplemental power sources 218. In this way, the strain on the first power source 224 is limited, as well as the amount of current that must be carried by the connecting cables 230.

Figure 16:
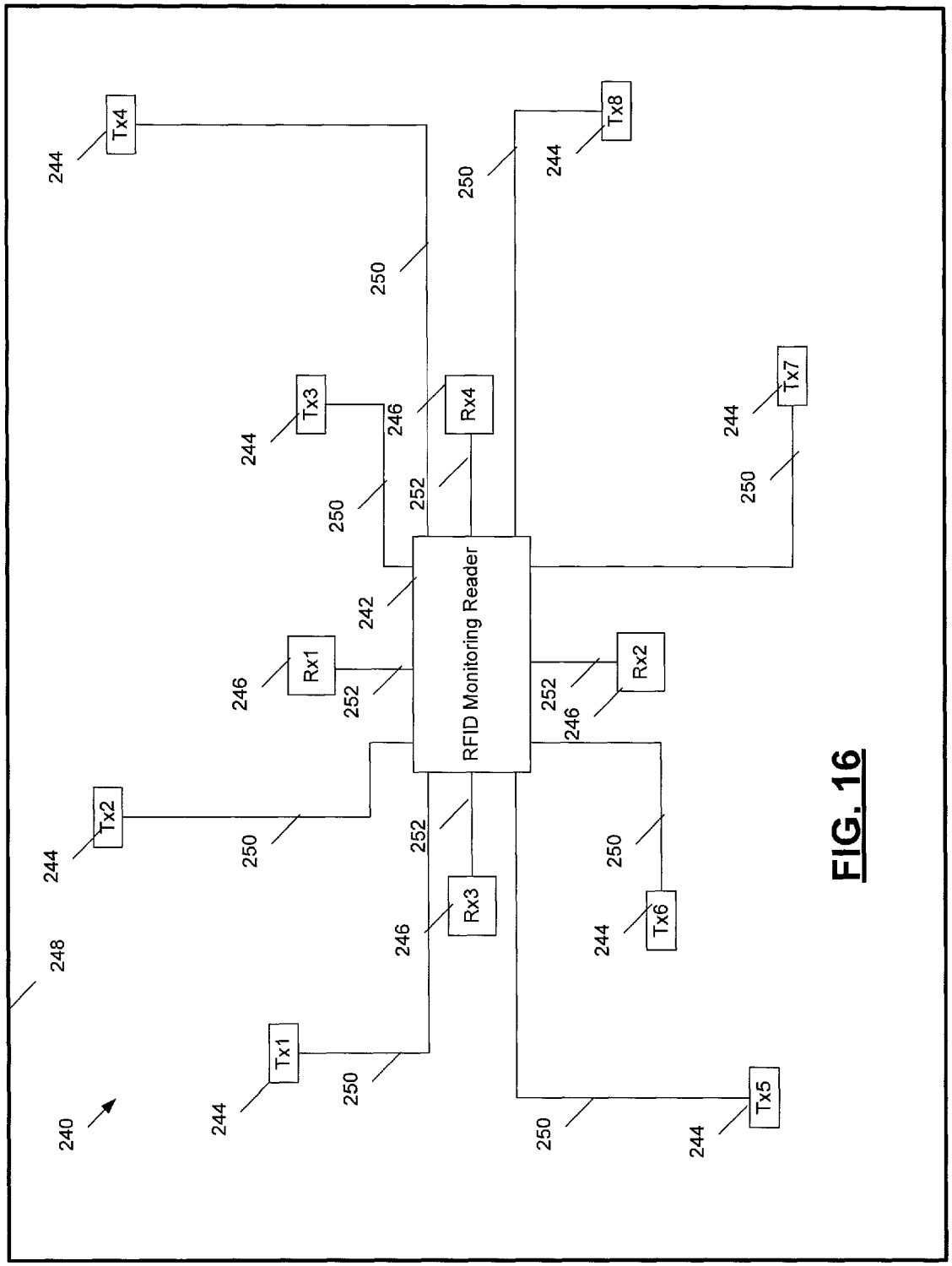
FIG. 16 is a block diagram depicting an RFID monitoring reader responsive to a number of transmitter units and a number of receiver units in a monitoring environment.

FIG. 16 is a block diagram depicting an RFID monitoring reader 242 responsive to a number of transmitter units 244 and a number of receiver units 246 in a monitoring environment 248. In tracking one or more RFID tags, the RFID monitoring unit 242 may direct a transmitter unit 244 to broadcast an identification impulse by sending transmit command data along one of the plurality of transmit paths 250. The transmit command data may include a protocol according to which the identification impulse is to be transmitted. The RFID monitoring reader 242 also selects one or more of the receiver units 246 to listen for RFID response signals in response to the transmitted identification impulse by sending receive command data on one of the receive paths 252. Receiver units 246 designated as selected by the receive command data listen for RFID response signals and propagate RFID response data to the RFID monitoring reader 242 detailing the detected RFID response signals.

Figure 17:
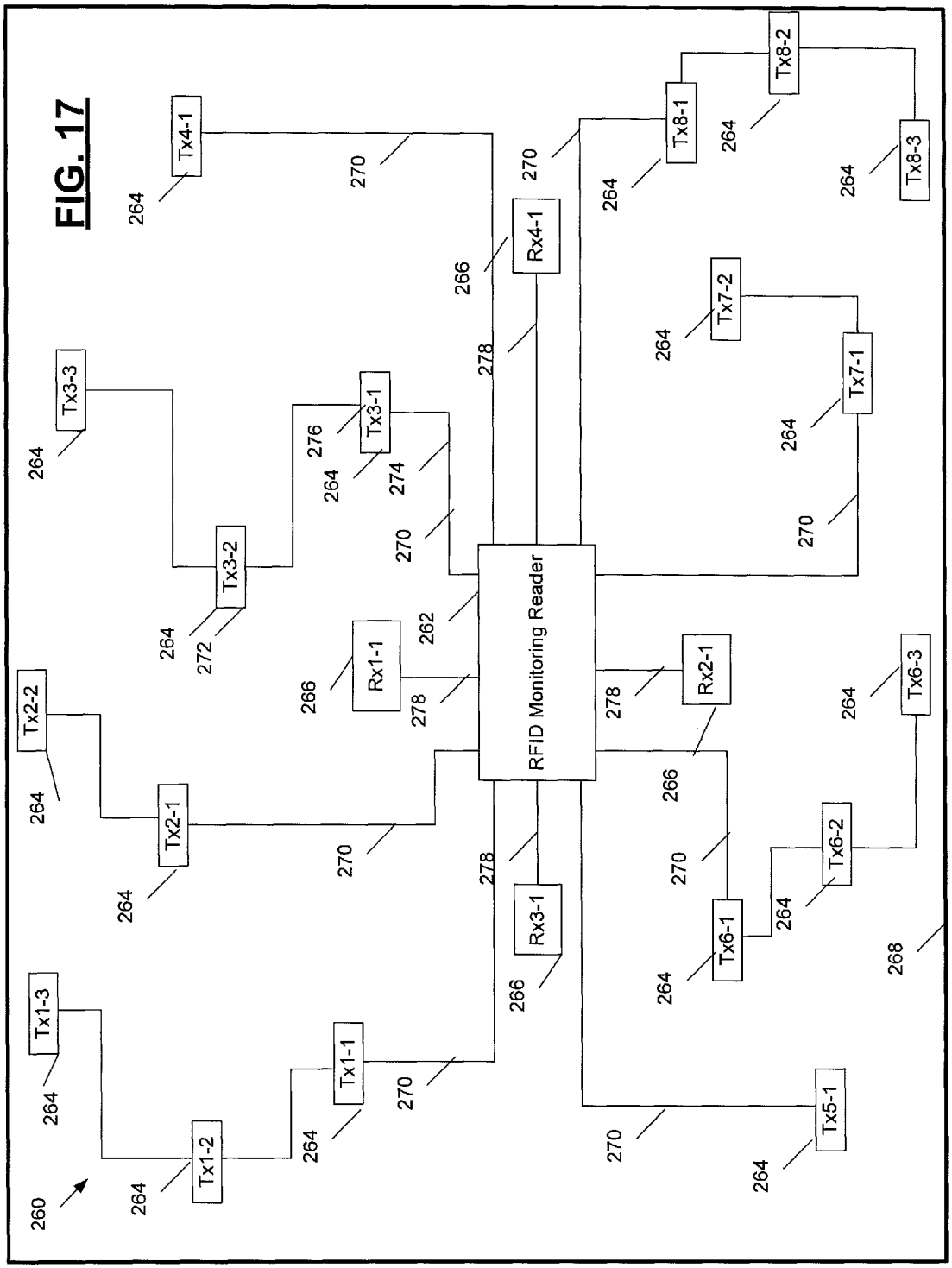
FIG. 17 is a block diagram depicting an RFID monitoring reader responsive to a number of serially connected transmitter units and a number of receiver units in a monitoring environment.

FIG. 17 is a block diagram depicting an RFID monitoring reader 262 responsive to a number of serially connected transmitter units 264 and a number of receiver units 266 in a monitoring environment 268. In tracking a one or more RFID tags, the RFID monitoring unit 262 may direct a transmitter unit 264 to broadcast an identification impulse by sending transmit command data along one of the plurality of transmit paths 270. The transmit command data may include a protocol according to which an identification impulse is to be sent. The transmit command data may also include data identifying which transmitter unit 264 along the selected transmit path is the selected transmitter unit for transmitting the identification impulse. For example, to select transmitter Tx3-2 272, the RFID monitoring unit 262 sends transmit command data along transmit path 274. The transmit command data identifies the second transmitter in the transmit path as the selected transmitter 272. Upon receipt of the transmit command data at transmitter Tx3-1 276, transmitter Tx3-1 276 enters a repeater mode, as described above with respect to FIG. 8, for example, and forwards the transmit command data to transmitter Tx3-2 272. Upon receipt of the transmit command data at transmitter Tx3-2 272, transmitter Tx3-2 272 enters a transmit mode, as described above with respect to FIG. 9, for example, and transmits the directed identification impulse. Transmitter Tx3-2 272 may or may not propagate the transmit command data to later transmitter units along the selected transmit path 274. The RFID monitoring reader 262 may also select one or more receiver units 266 for listening for RFID response signals in response to the transmitted identification impulse via receiver command data transmitted on one or more of the receiver paths 278. The receiver command data may identify a protocol according to which the selected receiver units should expect RFID response signals.

Figure 18:
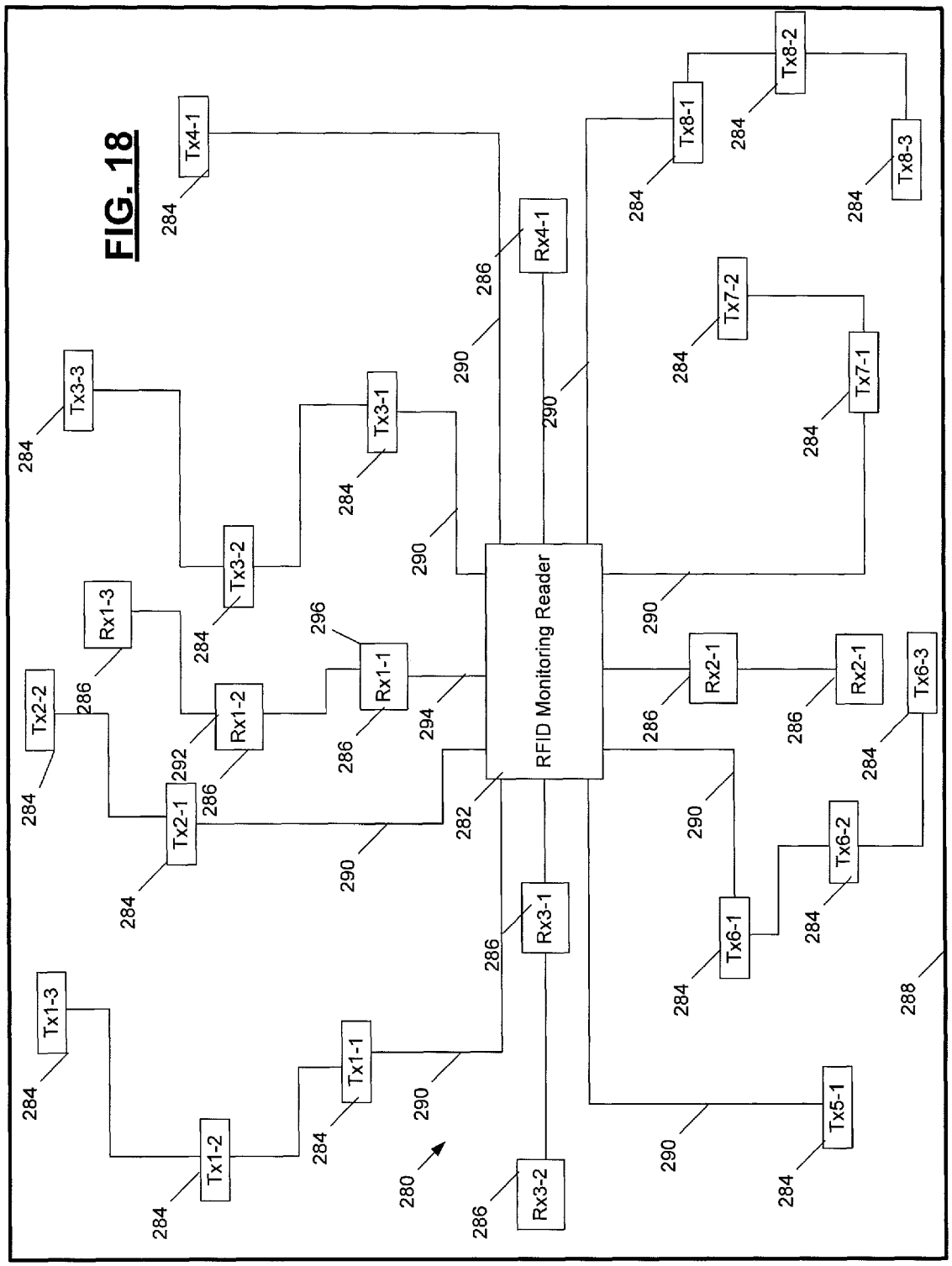
FIG. 18 is a block diagram depicting an RFID monitoring reader responsive to a number of serially connected transmitter units and a number of serially connected receiver units in a monitoring environment.

FIG. 18 is a block diagram depicting an RFID monitoring reader 282 responsive to a number of serially connected transmitter units 284 and a number of serially connected receiver units 286 in a monitoring environment 288. The RFID monitoring reader 282 selects a transmitter unit 284 along one of the transmit paths 290 to transmit an identification impulse signal. This may be accomplished, for example, as described with respect to FIG. 17. The RFID monitoring reader 282 also selects one or more receiver units 286 for listening for RFID response signals in response to the transmitted identification impulse. The receiver command data may identify a protocol according to which the selected receiver units should expect RFID response signals. The receive command data will identify which receiver units along a selected receive path 294 are selected receiver units to listen for RFID response signals. For example, to select transmitter Rx1-2 292, the RFID monitoring unit 282 sends receive command data along receive path 294. The receive command data identifies the second transmitter in the receive path as the selected receiver 292. Upon receipt of the receive command data at receiver Rx1-1 296, receiver Rx1-1 296 enters a repeater mode, as described above with respect to FIG. 12, for example, and forwards the receive command data to receiver Rx1-2 292. Upon receipt of the receive command data at receiver Rx1-2 292, receiver Rx1-2 292 enters a receive mode, as described above with respect to FIG. 13, for example, and listens for RFID response signals to propagate as RFID response data to the RFID monitoring reader. Receiver Rx1-2 292 may or may not propagate the receive command data to later transmitter units along the selected receive path 294.

Figure 19:
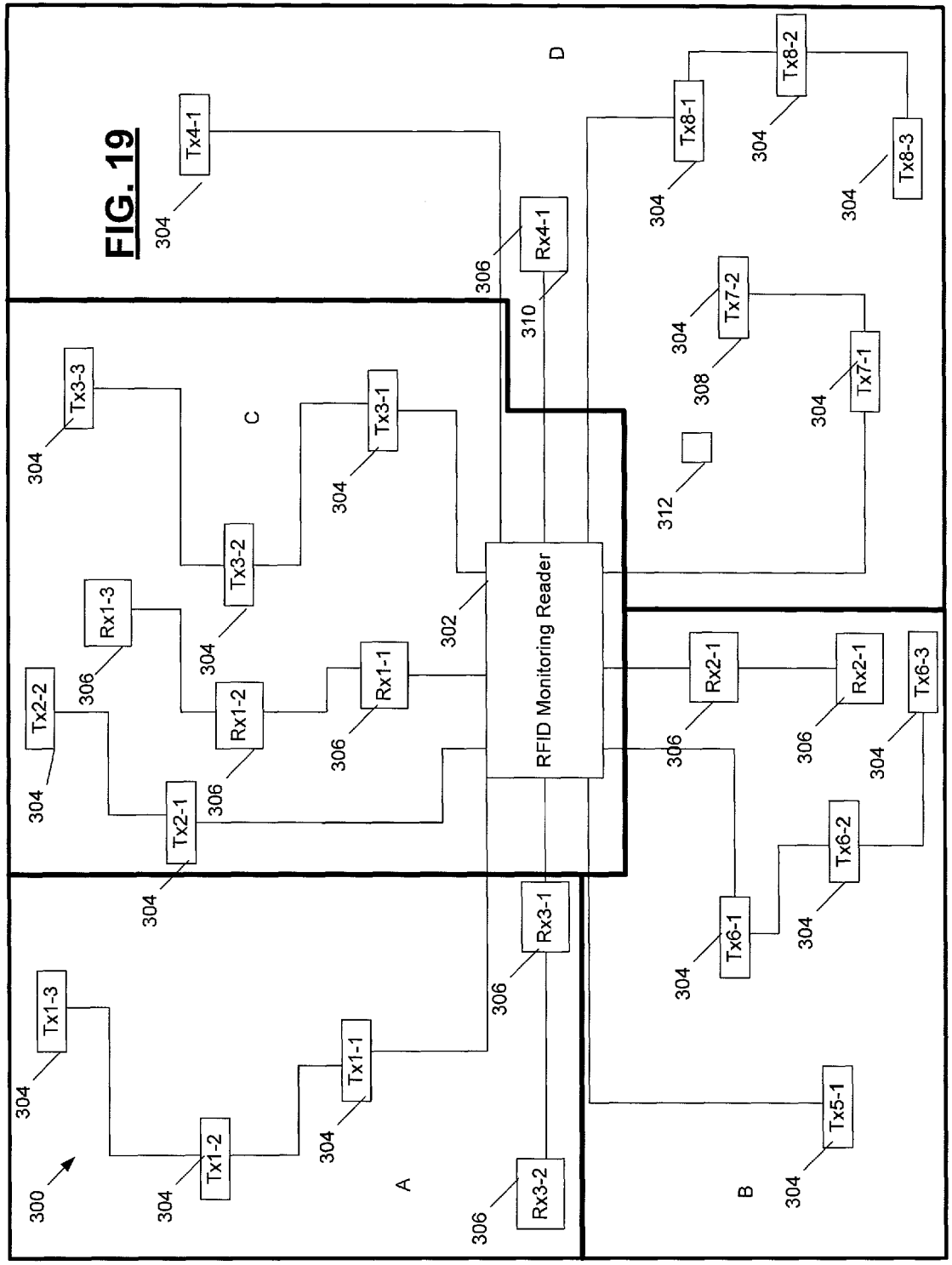
FIG. 19 is a block diagram depicting an RFID monitoring system that tracks locations of located RFID tags through the use of zones.

FIG. 19 is a block diagram depicting an RFID monitoring system that tracks locations of located RFID tags through the use of zones. The monitoring system includes an RFID monitoring reader that controls a plurality of transmitter units 304 and receiver units 306 over four zones labeled A, B, C, and D. By selecting a transmitter unit 304 and one or more receiver units 306 within a zone A, B, C, or D, a determination may be made as to whether an RFID tag is within or near the zone based on whether an RFID response is received at a selected receiver. This determination may be made based on the known maximum response distance characteristics of an RFID tag protocol. For example, if transmitter Tx7-2 308 and receiver Rx4-1 310 are selected and a response is received from an RFID tag 312 at receiver RX4-1 310, then a determination is made that RFID tag 312 is in or near zone D. The use of zones and specifically paired transmitter and receiver units allows determinations of not only whether a tag is present within an entire monitoring area, but also where in the monitoring area that tag resides. Location data may also be determined according to techniques described in U.S. Pat. No. 7,423,516, entitled "Systems and Methods for Approximating the Location of an RFID Tag," incorporated by reference herein.

Figure 20:
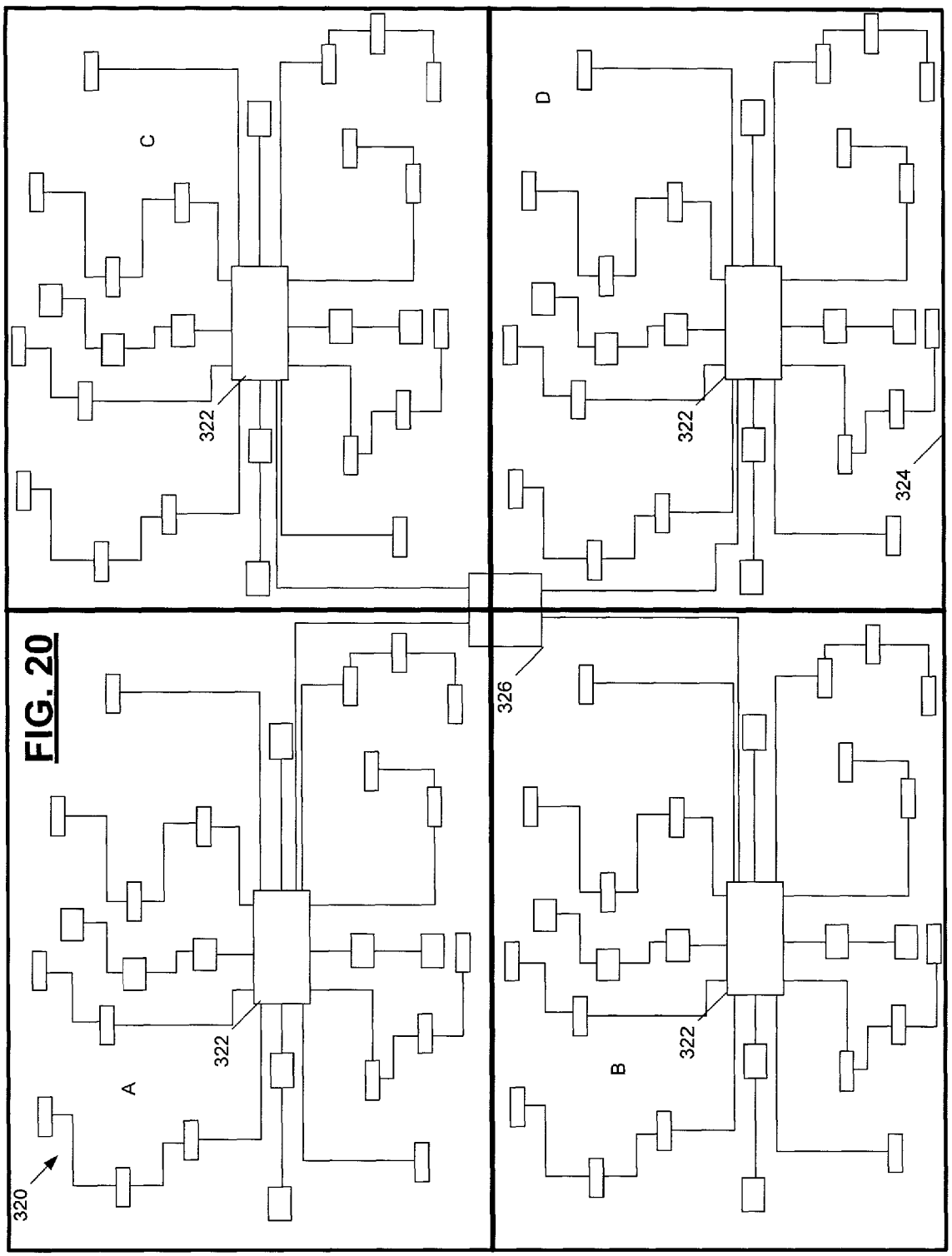
FIG. 20 is a block diagram depicting multiple RFID monitoring readers tracking a monitoring environment.

FIG. 20 is a block diagram depicting multiple RFID monitoring readers 322 tracking a monitoring environment 324. Each of the four RFID monitoring readers 322 monitors one of four quadrants A, B, C, and D of the monitoring environment 324. The RFID monitoring readers 322 are responsive to a central control monitor 326. The central control unit 326 may be a central data store for storing RFID response data received regarding each of the four quadrants A, B, C, D of the monitoring environment 324, or the central control unit 326 may take a more active role, directing each of the four RFID monitoring readers 322 as to RFID queries to be made in certain areas to seek locations of RFID tags. While FIG. 20 depicts four RFID monitoring readers 322 quartering the monitoring environment 324, other numbers of RFID monitoring readers and sectioning of the monitoring environment may be implemented. The sectioning of the monitoring environment not only enables yes/no data to be gathered about the presence of given RFID tags, but the sectioning also enables location data about RFID tags to be captured by monitoring which of the RFID monitoring units 322 receives RFID response data from a given tag. Location data may be further refined through the implementation of sub-zones as described with respect to FIG. 19. The use of multiple RFID monitoring units 322 may also promote faster system execution time as parallel RFID monitoring may be implemented by each of the four RFID monitoring units 322.

Figure 21:
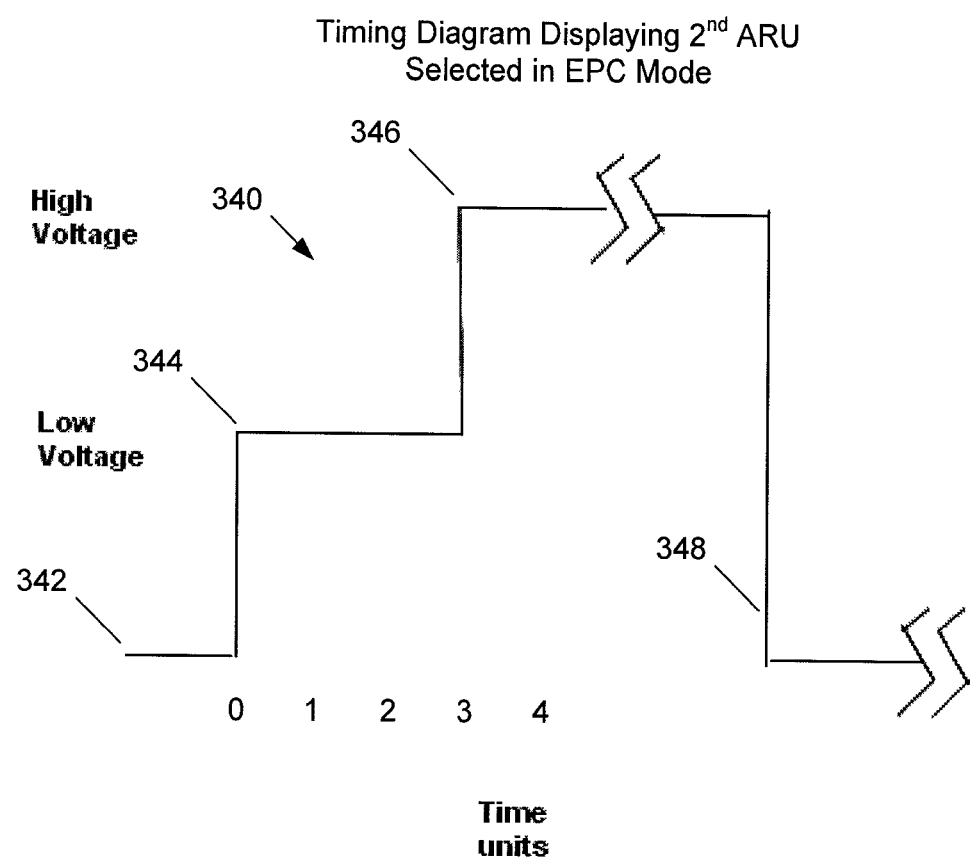
FIG. 21 is a timing diagram depicting a scheme for signaling which transmitter unit on a transmit path or which receiver on a receiver unit is selected for transmitting or receiving, respectively.

FIG. 21 is a timing diagram depicting a scheme for signaling which transmitter unit on a transmit path or which receiver unit on a receive path is selected for transmitting or receiving, respectively. The timing signal hibernates in a standby mode at a zero voltage level, as shown at 342. At t=0, the timing signal, sent through the transmitter or receiver serial connection lines, is set by the RFID monitoring reader at a first, low voltage, which signals the transmitter or receiver units to begin timing, as shown at 344. At t=3, the timing signal is set at a second, high voltage, as shown at 346, identifying the critical time as being t=3. Each of the serially connect units compares the detected critical time to a truth table that identifies the proper state for the unit to operate given the unit's position on the transmit or receive path and the critical time, as will be discussed with respect to FIGS. 23-27. Following signaling, the timing signal may return to the standby, zero voltage level, as shown at 348.

Figure 22:
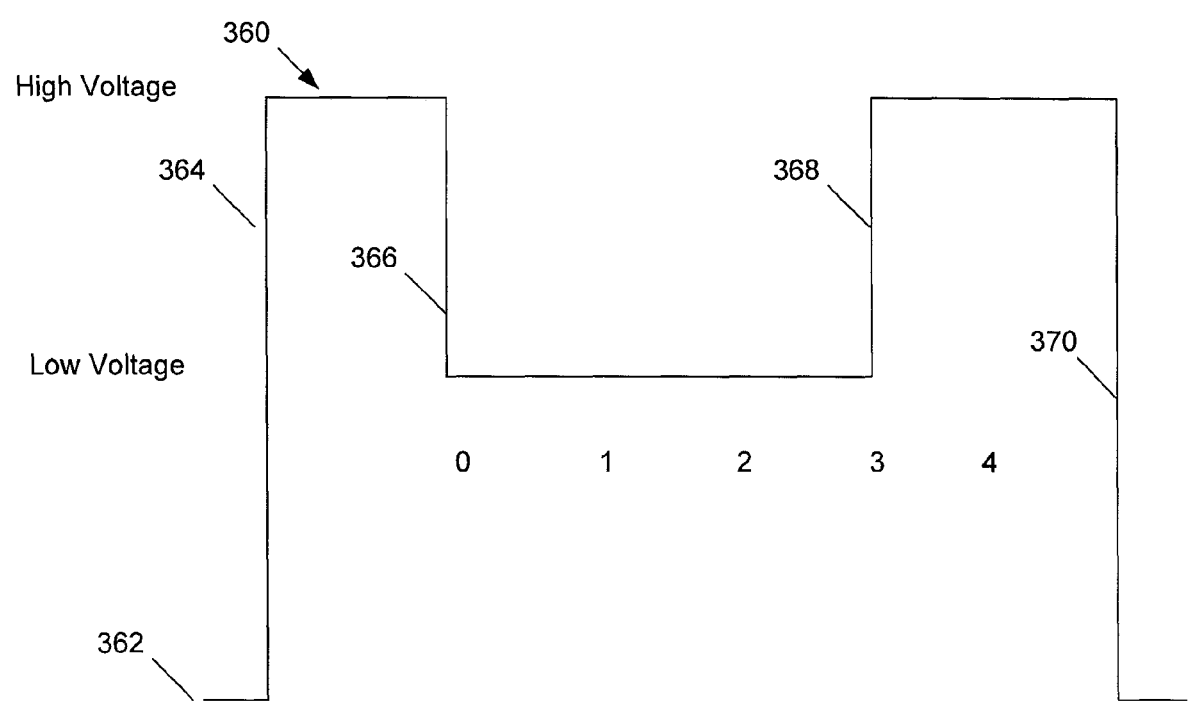
FIG. 22 is a timing diagram depicting a second example scheme for signaling which transmitter unit on a transmit path or which receiver on a receiver unit is selected for transmitting or receiving, respectively.

FIG. 22 is a timing diagram depicting a second example scheme for signaling which transmitter unit on a transmit path or which receiver unit on a receive path is selected for transmitting or receiving, respectively. The timing signal hibernates in a standby mode at a zero voltage level, as shown at 362. Prior to t=0, the timing signal is set at a high voltage level, as shown at 364. At t=0, the timing signal, sent through the transmitter or receiver serial connection lines, is set by the RFID monitoring reader at a low voltage level, which signals the transmitter or receiver units to begin timing, as shown at 366. At t=3, the timing signal is set back to the high voltage, as shown at 368, identifying the critical time as being t=3. Each of the serially connect units compares the detected critical time to a truth table that identifies the proper state for the unit to operate given the unit's position in along the transmit or receive path and the critical time, as will be discussed with respect to FIGS. 23-27. Following signaling, the timing signal may return to the standby, zero voltage level, as shown at 370.

FIG. 23 depicts a truth table utilized by a transmitter unit or a receiver unit in a set of serially connected units to determine the proper mode and protocol for operation. As described with respect to FIGS. 21 and 22, the RFID monitoring reader sends command data along a transmit path or a receive path, such as via a signal that identifies a critical time. The critical time may then be compared to a truth table, such as the table 380 shown in FIG. 23. Each antenna unit, listed along the top of the table 382 checks the table at the detected critical time, listed on the left side of the table 384, to determine its operation state. For example, if antenna number 5 detects a critical time at t=2, then antenna 5 will examine the second row of its column, as shown at 386, to determine that it is not the selected antenna. Antenna 5 would then configure itself into a proper configuration, such as in a repeater mode or standby mode, for being a non-selected antenna. If antenna 5 detected a critical time of t=9, antenna 5 would examine the ninth row, as shown at 388, to determine than antenna 5 is the selected antenna. The ninth row also identifies a protocol mode for functioning along the right side of the table 390, instructing antenna 5 to function in an EPC mode, as shown at 392, which may correspond to identifying passive EPC tags. If antenna 5 detected a critical time of t=10, antenna 5 would examine the tenth row, as shown at 394, to determine than antenna 5 is the selected antenna. The tenth row also identifies a proper protocol mode for functioning along the right side of the table 390, instructing antenna 5 to function in an GOL mode, as shown at 396 which may correspond to identifying battery assisted Goliath brand tags.

FIG. 24 depicts a second example truth table utilized by a transmitter unit or a receiver unit in a set of serially connected units to determine the proper mode and protocol for operation. The truth table 400 of FIG. 24 may be implemented in a similar fashion as the truth table of FIG. 23. The selected antenna states and protocol mode states are rearranged in FIG. 24 such that the first eight critical time units correspond to EPC mode, while the last eight critical time units correspond to GOL mode. This may be beneficial, for example, in systems where EPC mode is utilized more frequently. Thus, RFID tag locating may begin sooner, on average, upon detection of the more common earlier critical time. Other configurations may be implemented according to user preferences.

Figure 25:
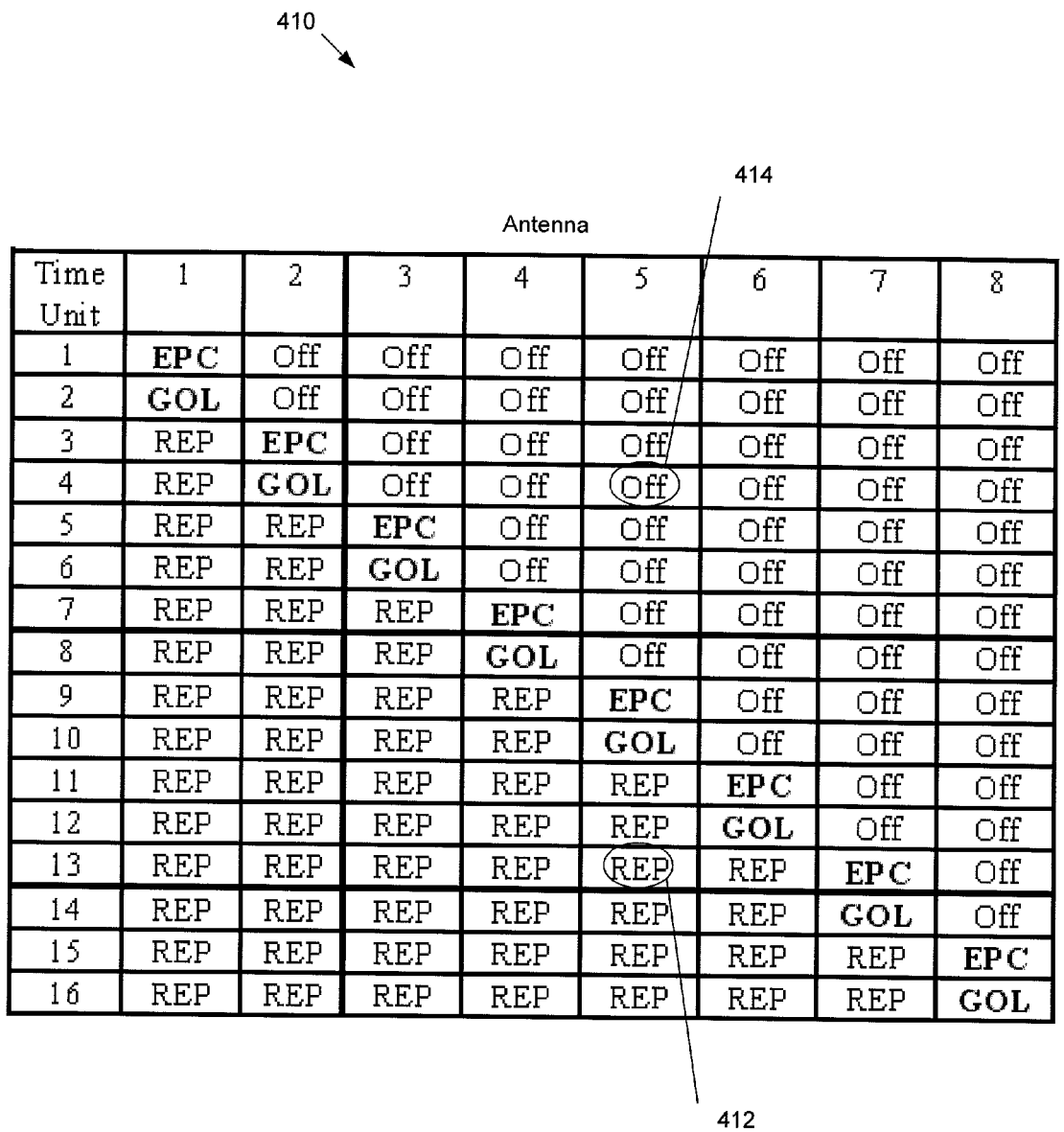
FIG. 25 depicts a third example truth table that includes a repeater state for units earlier on the transmit path or the receive path than the selected unit.

FIG. 25 depicts a third example truth table that includes a repeater state for units earlier on the transmit path or the receive path than the selected unit. The truth table 410 of FIG. 25 may be utilized in a similar manner as the above-described truth tables in FIGS. 23 and 24. For example, antenna 5 may operate in an EPC mode as the selected antenna if the critical time is detected at t=9, or antenna 5 may operate in a GOL mode as the selected antenna if the critical time is detected at t=10. Additionally, antenna 5 may be set to a repeater mode if the critical time is detected at t=13, as shown at 412. Repeater mode may instruct antenna 5 to pass command data to the next serially connected antenna. Repeater mode may also include amplification and conditioning of the command data and received response data, as described above with respect to FIGS. 8 and 12. If the critical time is detected at t=4, antenna 5 may operate in an off or standby mode, as shown at 414. An antenna in off or standby mode may not pass command data to the next serially connected antenna or may not amplify or condition the command data prior to propagating the command data, offering a power savings, as later antennas in the transmit or receive path are not selected and will not be sending an identification impulse or returning response data.

FIG. 26 depicts a fourth example truth table utilized by a transmitter unit or a receiver unit in a set of serially connected units to determine the proper mode for operation. The truth table 420 of FIG. 26 functions in a similar manner as above-described FIG. 25 but does not include multiple protocol modes of operation.

FIG. 27 depicts a fifth example truth table utilized by a transmitter unit or a receiver unit in a set of serially connected units that relies upon a voltage level for determining a critical value. The truth table 430 of FIG. 27 functions in a similar manner as above-described FIG. 25. However, instead of relying on a critical time value, as described in FIGS. 21 and 22, a transmit unit or receive unit instead determines the proper truth table cell for determining its operating state based on a voltage level signal. For example, FIG. 27 includes sixteen voltage levels that may be detected by an antenna unit in determining its operating state. In addition to critical time detection and voltage level detection, other signaling methods such as multiplexed tone frequencies or others methods may be used to signal antenna units as to their proper operating state.

This written description uses examples to disclose the invention, including the best mode, and also to enable a person skilled in the art to make and use the invention. It should be noted that the systems and methods described herein may be equally applicable to other implementations. The patentable scope of the invention may include other examples that occur to those skilled in the art.

For example, a system for monitoring a plurality of RFID tags may include at least one RFID signal receiver, the RFID signal receiver configured to receive RFID responses. The system may further include a plurality of serially connected transmitters along a transmit path, each of the serially connected transmitters configured to: relay a received transmitter selection signal when the transmitter selection signal identifies a selected transmitter as being further along the transmit path than the serially connected transmitter; transmit an identification impulse when the transmitter selection signal identifies the serially connected transmitter as being the selected transmitter; and operate in a standby mode when the transmitter selection signal identifies the selected transmitter as being closer on the transmit path than the serially connected transmitter. The system may also include a reader module responsive to the RFID signal receiver and further responsive to a plurality of transmit paths that include a plurality of serially connected transmitters on each path, the reader being configured to send the transmitter selection signal along a selected transmit path, the transmitter selection signal identifying one of the plurality of serially connected transmitters along the selected transmit path as the selected transmitter for transmitting the identification impulse.

Additionally, the plurality of RFID tags may include a plurality of first-protocol RFID tags and a plurality of second-protocol RFID tags, the first-protocol using passive RFID tags, the second-protocol using battery assisted RFID tags, where the transmitter selection signal further identifies a selected protocol according to which of the first-protocol and the second-protocol the identification impulse is to be transmitted, where the selected transmitter transmits the identification impulse in a low-power mode if the selected protocol is the second-protocol, and where the selected transmitter transmits the identification impulse in a high-power mode if the selected protocol is the first-protocol.

Further, at least one RFID signal receiver may include a plurality of serially connected RFID signal receivers along a plurality of receive paths, where the reader module is responsive to the plurality of receive paths, and where the reader module is configured to send a receiver selection signal along a selected receive path, the receiver selection signal identifying one of the plurality of serially connected receivers along the selected receive path as the selected receiver for receiving RFID responses.

As another example, a method for monitoring a plurality of RFID tags may include sending a transmitter selection signal from a reader module along a selected transmit path of a plurality of transmit paths, at least one transmit path including a plurality of serially connected transmitters, a selection signal identifying a selected transmitter of the serially connected transmitters along the selected transmit path for transmitting an identification impulse. The method may also include receiving the transmitter selection signal and relaying the transmitter selection signal at a transmitter along the selected transmit path that precedes the selected transmitter and receiving the transmitter selection signal at the selected transmitter. The method may further include transmitting the identification impulse from the selected transmitter, receiving RFID responses at an RFID signal receiver from RFID tags in response to the identification impulse, and propagating RFID response data from the RFID signal receiver to the reader module.

Additionally, the plurality of RFID tags may include plurality of first-protocol RFID tags and a plurality of second-protocol RFID tags, the first-protocol using passive RFID tags, the second-protocol using battery assisted RFID tags, where the transmitter selection signal further identifies a selected protocol according to which of the first-protocol and the second-protocol the identification impulse is to be transmitted, where the selected transmitter transmits the identification impulse in a low-power mode if the selected protocol is the second-protocol, and where the selected transmitter transmits the identification impulse in a high-power mode if the selected protocol is the first-protocol.

Further, a plurality of serially connected RFID signal receivers along a plurality of receive paths may be responsive to the reader module, where the reader module selects one of the serially connected RFID receivers on one of the receive paths using a receiver selection signal, the selected serially connected RFID receiver being configured to receive RFID responses and propagate the responses to the reader module.

As another example, a method for monitoring a plurality of RFID tags, the plurality of RFID tags including a plurality of first-protocol RFID tags and a plurality of second-protocol RFID tags, the first-protocol using passive RFID tags, the second-protocol using battery assisted RFID tags may include sending a transmitter selection signal from a reader module to a selected transmitter, a selection signal identifying a selected protocol according to which of the first-protocol and the second-protocol the identification impulse is to be transmitted and transmitting the identification impulse from the selected transmitter, the selected transmitter transmitting the identification impulse in a low-power mode if the selected protocol is the second-protocol, the selected transmitter transmitting the identification impulse in a high-power mode if the selected protocol is the first-protocol. The method may also include receiving RFID responses at an RFID signal receiver from RFID tags in response to the identification impulse and propagating RFID response data from the RFID signal receiver to the reader module.

What is claimed is:

1. A system for monitoring a plurality of RFID tags, the system comprising:
   a plurality of serially connected receivers along a receive path, a serially connected receiver configured to:
      relay a received receiver selection signal when a receiver selection signal identifies a selected receiver as being further along the receive path than the serially connected receiver;
      listen for an RFID response signal when the receiver selection signal identifies the serially connected receiver as being the selected receiver; and
      operate in a standby mode when the receiver selection signal identifies the selected receiver as being closer on the receive path than the serially connected receiver;
   a plurality of serially connected transmitters along a transmit path, a serially connected transmitter configured to:
      relay a received transmitter selection signal when a transmitter selection signal identifies a selected transmitter as being further along the transmit path than the serially connected transmitter;
      transmit an identification impulse when the transmitter selection signal identifies the serially connected transmitter as being the selected transmitter; and
      operate in a standby mode when the transmitter selection signal identifies the selected transmitter as being closer on the transmit path than the serially connected transmitter; and
   a reader responsive to a plurality of receive paths that include a plurality of serially connected receivers on a receive path, the reader being further responsive to a plurality of transmit paths that include a plurality of serially connected transmitters on a transmit path, the reader being configured to send the receiver selection signal along a selected receive path, the receiver selection signal identifying one of the plurality of serially connected receivers along the selected receive path as the selected receiver for listening for an RFID response signal, the reader being further configured to send the transmitter selection signal along a selected transmit path, the transmitter selection signal identifying one of the plurality of serially connected transmitters along the selected transmit path as the selected transmitter for transmitting the identification impulse;
   wherein the plurality of RFID tags include a plurality of first-protocol RFID tags and a plurality of second-protocol RFID tags, a first-protocol using passive RFID tags, a second-protocol using battery assisted RFID tags;
   wherein the transmitter selection signal further identifies a selected protocol according to which of the first-protocol and the second-protocol the identification impulse is to be transmitted;
   wherein the selected transmitter transmits the identification impulse in a low-power mode if the selected protocol is the second-protocol; and
   wherein the selected transmitter transmits the identification impulse in a high-power mode if the selected protocol is the first-protocol.

2. The system of claim 1, wherein the receiver selection signal comprises:

a start indicator; and a receiver selection indicator;

wherein a length of a receiver selection time period between the start indicator and the receiver selection indicator identifies the selected receiver.

3. The system of claim 2, wherein a second receiver along the selected receive path is the selected receiver when the receiver selection time period is two units in length;

wherein a third receiver along the selected receive path is the selected receiver when the receiver selection time period is three units in length.

4. The system of claim 1, wherein the reader identifies a selected receiver by a voltage of the receiver selection signal sent along the receive path.

5. The system of claim 1, wherein a serially connected receiver comprises:

an antenna path; and a hardwired input path;

wherein the antenna path is utilized when the serially connected receiver is the selected receiver.

6. The system of claim 1, wherein a position of a serially connected receiver in a receive path is identified via a manually adjusted mechanism on the serially connected receiver.

7. A system for monitoring a plurality of RFID tags, the system comprising:

a plurality of serially connected receivers along a receive path, a serially connected receiver configured to:

relay a received receiver selection signal when a receiver selection signal identifies a selected receiver as being further along the receive path than the serially connected receiver;

listen for an RFID response signal when the receiver selection signal identifies the serially connected receiver as being the selected receiver; and operate in a standby mode when the receiver selection signal identifies the selected receiver as being closer on the receive path than the serially connected receiver;

wherein a serially connected receiver comprises an amplifier;

wherein the serially connected receiver relays a received receiver selection signal using a first gain;

wherein the serially connected receiver relays a calibration signal at a second gain;

wherein the second gain is less than the first gain; and wherein the serially connected receiver identifies a position in the receive path based on in which of a plurality of ranges the calibration signal is measured at the serially connected receiver; and a reader responsive to a plurality of receive paths that include a plurality of serially connected receivers on a receive path, the reader being configured to send the receiver selection signal along a selected receive path, the receiver selection signal identifying one of the plurality of serially connected receivers along the selected receive path as the selected receiver for listening for an RFID response signal.

8. A system for monitoring a plurality of RFID tags, the system comprising:

a plurality of serially connected transmitters along a transmit path, a serially connected transmitter configured to:

relay a received transmitter selection signal when a transmitter selection signal identifies a selected transmitter as being further along the transmit path than the serially connected transmitter;

transmit an identification impulse when the transmitter selection signal identifies the serially connected transmitter as being the selected transmitter; and operate in a standby mode when the transmitter selection signal identifies the selected transmitter as being closer on the transmit path than the serially connected transmitter; and a reader responsive to a plurality of transmit paths that include a plurality of serially connected transmitters on a transmit path, the reader being configured to send the transmitter selection signal along a selected transmit path, the transmitter selection signal identifying one of the plurality of serially connected transmitters along the selected transmit path as the selected transmitter for transmitting the identification impulse;

wherein the plurality of RFID tags include a plurality of first-protocol RFID tags and a plurality of second-protocol RFID tags, a first-protocol using passive RFID tags, a second-protocol using battery assisted RFID tags;

wherein the transmitter selection signal further identifies a selected protocol according to which of the first-protocol and the second-protocol the identification impulse is to be transmitted;

wherein the selected transmitter transmits the identification impulse in a low-power mode if the selected protocol is the second-protocol; and wherein the selected transmitter transmits the identification impulse in a high-power mode if the selected protocol is the first-protocol.

9. The system of claim 8, wherein the transmitter selection signal comprises:

a start indicator; and a transmitter selection indicator;

wherein a length of a transmitter selection time period between the start indicator and the transmitter selection indicator identifies the selected transmitter.

10. The system of claim 8, wherein the reader identifies a selected transmitter by a voltage of the transmitter selection signal sent along the transmit path.

11. The system of claim 8, wherein a serially connected transmitter comprises:

an antenna path; and a hardwired output path;

wherein the antenna path is utilized when the serially connected transmitter is the selected transmitter.

12. The system of claim 8, wherein a position of a serially connected transmitter in a transmit path is identified via a manually adjusted mechanism on the serially connected transmitter.

13. The system of claim 8, wherein a position of a serially connected transmitter in a transmit path is identified by measuring a signal strength of a calibration signal at the serially connected transmitter.

14. A system for monitoring a plurality of RFID tags, the system comprising:

a plurality of serially connected transmitters along a transmit path, a serially connected transmitter configured to:

relay a received transmitter selection signal when a transmitter selection signal identifies a selected transmitter as being further along the transmit path than the serially connected transmitter;

transmit an identification impulse when the transmitter selection signal identifies the serially connected transmitter as being the selected transmitter; and operate in a standby mode when the transmitter selection signal identifies the selected transmitter as being closer on the transmit path than the serially connected transmitter; and a reader responsive to a plurality of transmit paths that include a plurality of serially connected transmitters on a transmit path, the reader being configured to send the transmitter selection signal along a selected transmit path, the transmitter selection signal identifying one of the plurality of serially connected transmitters along the selected transmit path as the selected transmitter for transmitting the identification impulse;

wherein a serially connected transmitter comprises an amplifier;

wherein the serially connected transmitter relays a received transmitter selection signal using a first gain;

wherein the serially connected transmitter relays a calibration signal at a second gain;

wherein the second gain is less than the first gain;

wherein the serially connected transmitter identifies a position in the transmit path based on which of a plurality of ranges the calibration signal is measured at the serially connected transmitter.

15. The system of claim 14, wherein a transmitter utilizes two linear crossed dipole antennas radiating sequentially in transmitting the identification impulse.

\* \* \* \* \*